US008243554B2

(12) United States Patent
Kajitani

(10) Patent No.: US 8,243,554 B2
(45) Date of Patent: Aug. 14, 2012

(54) ANALOG TYPE ELECTRONIC TIMEPIECE

(75) Inventor: Haruo Kajitani, Akiruno (JP)

(73) Assignee: Casio Computer Co., Ltd., Tokyo (JP)

( * ) Notice: Subject to any disclaimer, the term of this patent is extended or adjusted under 35 U.S.C. 154(b) by 316 days.

(21) Appl. No.: 12/752,382

(22) Filed: Apr. 1, 2010

(65) Prior Publication Data

US 2010/0254224 A1 Oct. 7, 2010

(30) Foreign Application Priority Data

Apr. 6, 2009 (JP) ................................ 2009-091831

(51) Int. Cl.
*G04C 11/02* (2006.01)
*H04L 27/06* (2006.01)

(52) U.S. Cl. ........................................ 368/47; 375/342

(58) Field of Classification Search .................... 368/46, 368/47; 329/349, 353; 375/340, 342
See application file for complete search history.

(56) References Cited

U.S. PATENT DOCUMENTS 5,349,570 A * 9/1994 Kaiser ............................ 368/47
6,522,601 B2 * 2/2003 Sakuyama ...................... 368/47
7,369,628 B2 5/2008 Haefner et al.
7,710,833 B2 * 5/2010 Shimizu .......................... 368/47
7,903,501 B2 * 3/2011 Fujisawa ......................... 368/47
2005/0116856 A1 * 6/2005 Haefner et al. ............ 342/357.1
2005/0122952 A1 * 6/2005 Haefner et al. ............... 370/350
2005/0147080 A1 * 7/2005 Haefner et al. ............... 370/350
2005/0169230 A1 * 8/2005 Haefner ........................ 370/345
2005/0175039 A1 * 8/2005 Haefner et al. ............... 370/503
2009/0016171 A1 * 1/2009 Fujisawa ......................... 368/47

FOREIGN PATENT DOCUMENTS

JP 3576079 B2 2/2002
JP 2005-214982 A 8/2005
JP 2006-119049 A 5/2006

OTHER PUBLICATIONS

Japanese Office Action dated May 24, 2011 (and English translation thereof) in counterpart Japanese Application No. 2009-091831.

* cited by examiner

*Primary Examiner* — Vit Miska
(74) *Attorney, Agent, or Firm* — Holtz, Holtz, Goodman & Chick, PC

(57) ABSTRACT

An analog type electronic timepiece including a plurality of hands for displaying a time; a driving unit for electrically driving the hands; a receiver for receiving and demodulating a radio wave containing a time code signal; and a second synchronization determination unit for determining a second synchronous point of the time code signal demodulated by the receiver through identifying a driving noise mixed in the time code signal by action of the driving unit.

17 Claims, 12 Drawing Sheets

ANALOG TYPE ELECTRONIC TIMEPIECE

CROSS-REFERENCE TO RELATED APPLICATIONS

This application is based on and claims the benefit of priority from the prior Japanese Patent Application. No. 2009-091831 filed on Apr. 6, 2009 including specification, claims, drawings and summary, the entire contents of which are incorporated herein by reference.

BACKGROUND OF THE INVENTION

1. Field of the Invention

The present invention relates to an analog type electronic timepiece having functions of driving hands (indicator needles) to display the time and also receiving a standard radio wave.

2. Description of. Related Art

There is a case where a driving noise mixes into a reception signal of a standard radio wave when a motor for rotating the hands is driven. Particularly, a large driving noise appears when the radio wave intensity of the standard radio wave is weak.

Therefore, conventional electronic timepieces each of which has an analog display unit have been controlled so that the driving of the hands is stopped when the standard radio wave is received or the driving timing of the hand is staggered to a timing which does not adversely affect reception of a radio wave when reception of the standard radio wave is started.

Furthermore, Japanese Patent No. 3,576,079 discloses a technique of dispersing the driving timing of a motor at a non-one-second period when a second-indicating signal in a radio wave signal is detected.

In general, it takes a relatively long time to receive a standard radio wave and obtain a time code. Therefore, when a hand driving is stopped during reception of the radio wave, it is impossible for a user to check a second figure and a minute figure of time during that period.

Furthermore, with respect to an electronic timepiece which is controlled so that the driving timing of the hand is staggered so that the reception of the radio wave is not adversely affected, there is a case where the driving timing of the hand is frequently staggered, which makes a user feel discomfort or it is impossible to identify an accurate time code when the radio wave intensity of the standard radio wave is weak.

The present invention has an object to provide an analog type electronic timepiece that can receive an accurate time code with neither stopping the hand driving nor frequently varying the hand driving timing.

SUMMARY OF THE INVENTION

According to an aspect of the present invention, there is provided an analog type electronic timepiece comprising: a plurality of hands for displaying a time; a driving unit for electrically driving the hands; a receiver for receiving and demodulating a radio wave containing a time code signal; and a second synchronization determination unit for determining a second synchronous point of the time code signal demodulated by the receiver through identifying a driving noise mixed in the time code signal by action of the driving unit.

Furthermore, according to another aspect of the present invention, there is provided an analog type electronic timepiece comprising: a plurality of hands for displaying a time; a driving unit for electrically driving the hands; a receiver for receiving and demodulating a radio wave containing a time code signal; a controller that inputs the demodulated time code signal and has an interrupt function caused by a rising input of the demodulated time code signal and an interrupt function caused by a falling input of the demodulated time code signal; a first interrupt controller for enabling the interrupt function of the rising input when a processing shifts to pulse detecting processing of the time code signal; a first timing detector for detecting a rising timing of the time code signal by the interrupt function of the rising input; a noise judger for judging whether a rising pulse of the time code signal detected by the first timing detector is caused by an instantaneous noise or not on the basis of width of the rising pulse; a second interrupt controller for enabling the interrupt function of the falling input provided that the first timing detector detects the rising timing and then the noise judger judges the rising pulse being not caused by the instantaneous noise; a time counter for starting time count of a rising pulse width of the time code signal provided that the first timing detector detects the rising timing and then the noise judger judges the rising pulse being not caused by the instantaneous noise; a second timing detector for detecting a falling timing of the time code signal by the interrupt function of the falling input; a comparator for judging whether a count value of the time counter exceeds the predetermined first time width when the second timing detector detects the falling timing; a second synchronization time counter for setting a detected timing of the second timing detector as a candidate of a second synchronous point of the time code signal when the comparator judges that the count value exceeds the predetermined first time width, and starting to count a time from a timing of one of the candidates of the second synchronous point till a timing of another of the candidates of the second synchronous point obtained next; a second synchronization judging unit for judging whether the candidate of the second synchronous point is true or not on the basis of a count value of the second synchronization time counter; and a second synchronization determination unit for determining as the second synchronous point of the time code signal the candidate which is judged as being true by the second synchronization judging unit, wherein the predetermined first time width compared by the comparator is set to a value that is longer than a time width of a driving noise mixed in the time code signal by action of the driving unit and also shorter than minimum time width of a rising pulse contained in an ideal time code signal having no noise.

DESCRIPTION OF THE PREFERRED EMBODIMENT

A preferred embodiment according to the present invention will be described hereunder with reference to the accompanying drawings.

Figure 1:
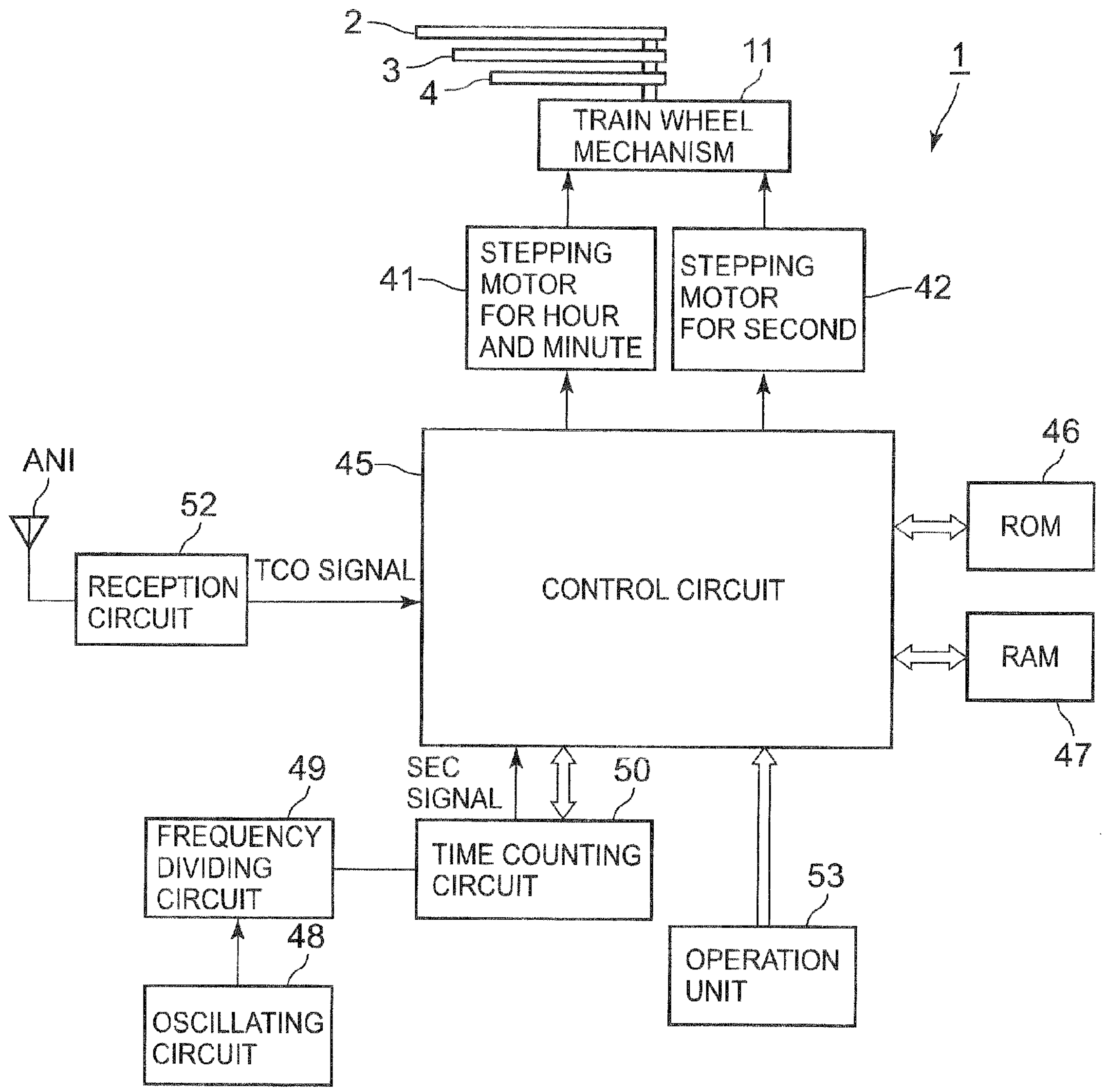
FIG. 1 is a block diagram showing the overall construction of an analog type electronic timepiece according to an embodiment of the present invention.

FIG. 1 is a block diagram showing the overall construction of an analog type electronic timepiece according to an embodiment of the present invention.

The analog type electronic timepiece 1 according to this embodiment rotates a plurality of hands (indicating needles) 2 to 4 on a character plate to display the time, and it includes a second hand 2, a minute hand 3, a hour hand 4, a train wheel mechanism 11 which comprises a plurality of gears and transmits motion of a motor to rotate the hands 2 to 4, a stepping motor 41 as a driving unit for rotating the hour hand 4 and the minute hand 3, a stepping motor 42 as a driving unit for rotating the second hand step by step every second, a control circuit 45 as a controller for performing the overall control of the timepiece, ROM (Read Only Memory) 46 for storing control programs to be executed by the control circuit 45 and control data, RAM (Random Access Memory) 47 for supplying a working memory space to the control circuit 45, a receiving circuit 52 as a receiver for receiving a standard radio wave containing a time code signal through an antenna AN1 and reproducing a TCO (time code output) signal, an oscillating circuit 48 and a frequency diving circuit 49 for generating a signal having a fixed frequency for time count, a time counting circuit 50 for counting the signal of the fixed frequency to count the time, an operating unit 53 for inputting an operation instruction from the external, etc.

Figure 2:
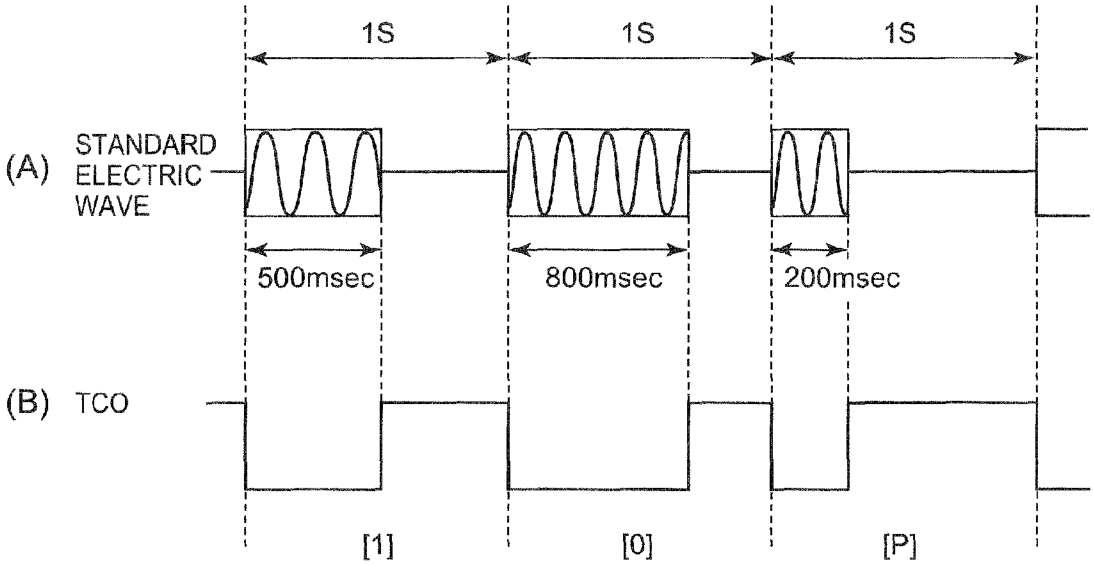
FIG. 2 is a waveform diagram showing a pulse signal of a standard electronic wave and a TCO signal output from a receiving circuit.

FIG. 2 are waveform diagrams showing a pulse signal of the standard radio wave received by the receiving circuit 52 (A), and a TCO signal output from the receiving circuit 52 (B).

The standard radio wave received by the receiving circuit 52 is a radio wave signal obtained by subjecting a carrier wave to amplitude modulation using a time code arranged in a predetermined format. The time code is obtained by arranging a plurality of kinds of pulse signals different in pulse width and pulse pattern in one frame. For example, as shown in (A) of FIG. 2, a "1" signal comprising a high-level pulse of 500 ms, a "0" signal comprising a high-level pulse of 800 ms and a "P" signal comprising a high-level pulse of 200 ms are arranged according to a predetermined format. The "0" signal represents a data value "0", the "1" signal represents a data value "1", and the "P" signal is a position maker representing the frame position of the time code.

In this embodiment, an M signal (maker pulse) representing a frame start point is also called as P signal. One pulse signal is arranged for one second, and a time code of one frame is constructed by subsequent 60 pulse signals. With respect to the standard radio wave of Japan, a second synchronous point (a decimal point zero second of each second, such as 0.0 second, 1.0 second, . . . , and 59.0 second) is represented by a rising timing of each pulse signal, and a minute synchronous point (zero second of each minute) is represented by a start point of one frame. The P signal is disposed at the start edge of one frame of the time code, and also disposed at the terminal edge of each of sub frames obtained by dividing one frame into six parts. Accordingly, when two P signals are sequential to each other, the start point of the subsequent P signal represents a minute synchronous point.

The receiving circuit 52 detects the standard radio wave as described above, and reproduces and outputs an active-low TCO (time code output) signal which is set to low level when the amplitude level of the pulse signal of (A) of FIG. 2 is high and also set to high level when the amplitude level is low.

The time counting circuit 50 counts a period signal from the frequency dividing circuit 49 to count the date and hour. An SEC signal is outputted from the time counting circuit 50 to the control circuit 45 at a period of one second. The time count data of the time counting circuit 50 are allowed to be read out by the control circuit 45 or rewritten by the control circuit 45.

The control circuit 45 normally makes the stepping motor 42 for the second hand 2 execute stepping drive in synchronism with the SEC signal from the time counting circuit 50 to rotate the second hand 2. Furthermore, the control circuit 45 makes the stepping motor 41 for hour and minute execute stepping drive every time the SEC signal is input at a plurality of times, thereby rotating the minute hand 3 and the hour hand 4. The time is displayed by the driving control of the hands 2 to 4 as described above.

When a predetermined operation is input from the operating unit 53 or when the time count data of the time counting circuit 50 reaches a value representing a predetermined time, the control circuit 45 executes a reception processing program in ROM 46 to execute the reception processing of the standard radio wave and the correction processing of the time of the time counting circuit 50.

The control circuit 45 has an interrupt function based on an input of the SEC signal from the time counting circuit 50, an interrupt function based on a rising input of the TCO signal, an interrupt function based on a falling input of the TCO signal, an interrupt function based on a time count of second synchronous points by an internal counter.

[Reception Processing]

Next, the reception processing of the standard radio wave executed by the control circuit 45 will be described.

Figure 3:
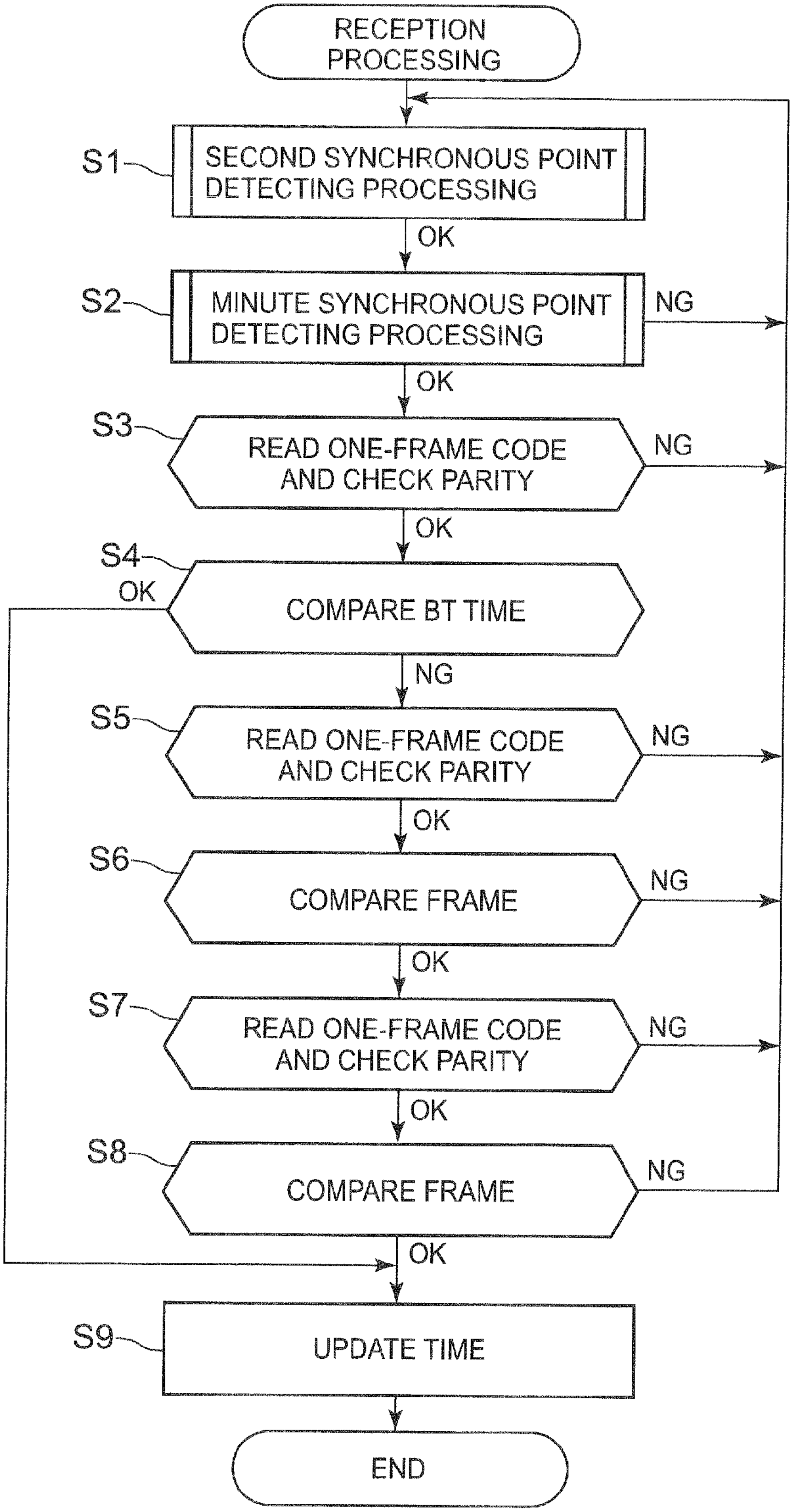
FIG. 3 is a flowchart showing a control procedure of reception processing of the standard electronic wave executed by a control circuit.

FIG. 3 is a flowchart showing the control procedure of the reception processing of the standard radio wave executed by the control circuit.

When the reception processing is started, the control circuit 45 first executes the processing of detecting a second synchronous point (a decimal point zero second of each second) from the TCO signal of the reception circuit 52 (step S1) Subsequently, the control circuit 45 executes the processing of detecting a minute synchronous point (zero second of each minute) from the TCO signal (step S2). When the second synchronous point is not normally detected in the second synchronous point detecting processing and thus the processing is finished with an error, the processing is retried from the detection processing of the second synchronous point in step S1. In this embodiment, the second synchronization determination unit and the minute synchronization determination unit are constructed by the control circuit 45 for executing the second synchronous point detecting processing and the minute synchronous point detecting processing.

In this embodiment, during the period of the second synchronous point detecting processing and the minute synchronous point detecting processing, the second-by-second stepping drive of the second hand 1 is not stopped, and also a timing of the stepping drive of the second hand 2 is not frequently changed. The second synchronous point detecting processing and the minute synchronous point detecting processing will be described in detail later.

When the second synchronous point and the minute are detected, the control circuit 45 reads the code of one frame of the time code from the TCO signal and executes parity check (step S3). The time code is added with a parity bit, and thus the control circuit 45 can check whether the read code is wrong or not.

When the time code of one frame is read and the parity check is executed, the control circuit 45 deciphers the time code and obtains time information. Thereafter, the control circuit 45 compares the thus-obtained time information with the time (basic time) counted in the time counting circuit 50 (step S4). When this comparison result indicates "coincidence", the processing jumps to time updating processing of step S9. However, when the comparison result indicates "non-coincidence", the processing shifts to step S5.

When the processing shifts to step S5, the control circuit 45 reads the code of one frame of the time code from the TCO signal and executes parity check (step S5) again, and executes frame comparison with the previously read time code to determine whether the present time information is time information added with one minute (step S6). The processing as described above is repeated twice (steps S7 and S8). When all the processing is regular, the processing shifts to the time updating processing of step S9.

When an error in the time code is detected through the parity check of the steps S3, S5 and S7 or when irregularity is detected in the frame comparison of the steps S6 and S8, the processing returns to the step S1 to retry the processing from the beginning.

When the code reading of the time code is normally executed and thus the processing shifts to the step S9, the time cont data of the time counting circuit 50 is corrected on the basis of the time information of the time code. For example, the values of the date and the hour and minute are corrected, and the correction is executed so that the timing of generating the SEC signal is made coincident with the second synchronous point detected in step S1. Then, this reception processing is finished.

[Second Synchronous Point Detecting Processing]

Next, the second synchronous point detecting processing executed in step S1 of the reception processing (FIG. 3).

Figure 4:
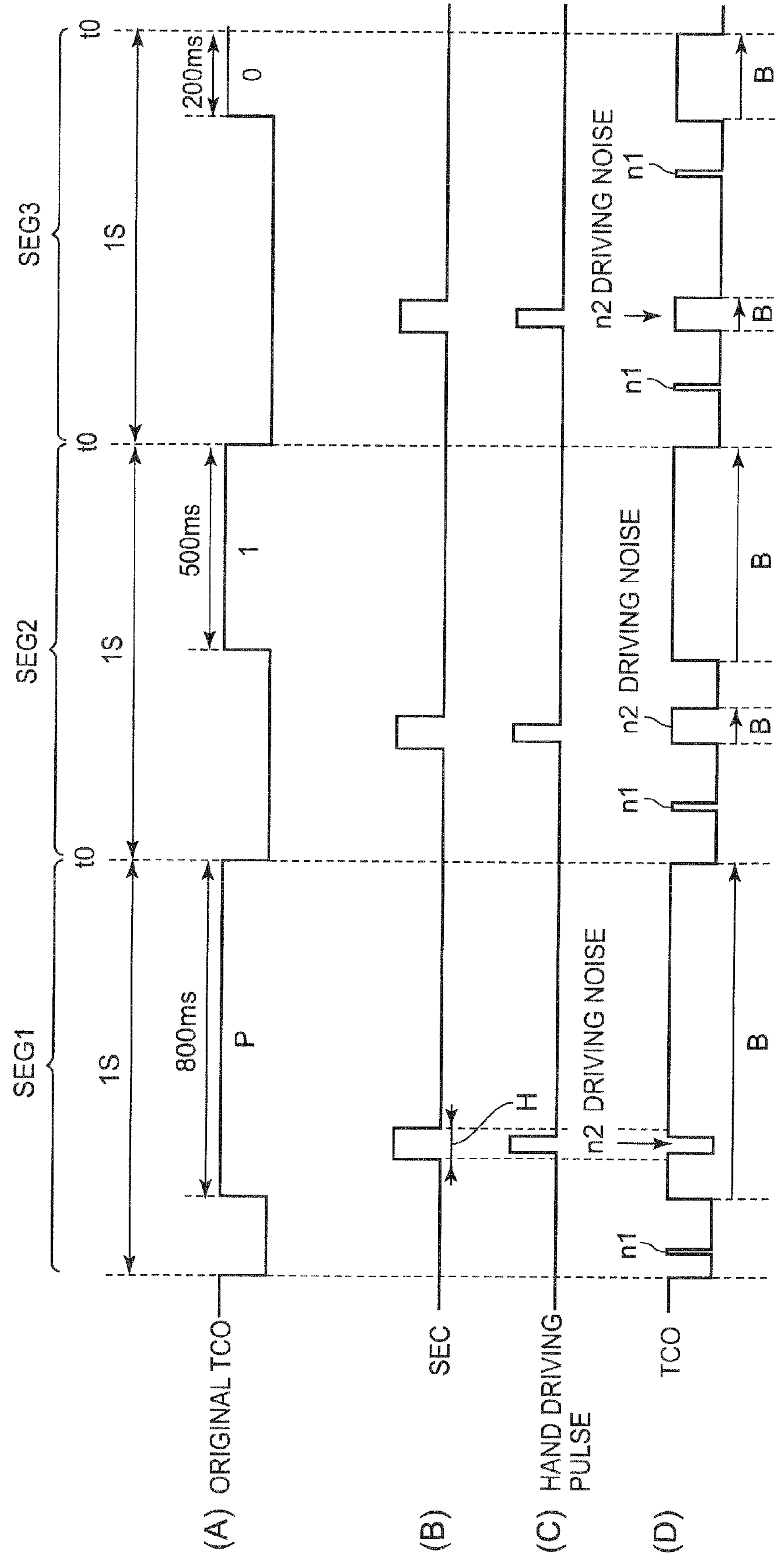
FIG. 4 is a time chart showing the processing content of second synchronous point detecting processing, wherein (A) represents an ideal TCO signal, (B) represents an SEC signal, (C) represents a hand driving pulse, and (D) represents an actual TCO signal.

FIG. 4 is a time chart showing the processing content of the second synchronous point detecting processing. In FIG. 4, (A) represents an ideal TCO signal, (B) represents an SEC signal, (C) represents a hand driving pulse and (D) represents a TCO signal.

In the second synchronous point detecting processing, the control circuit 45 detects a falling timing of the original TCO signal as a second synchronous point t0. However, as shown in (D) of FIG. 4, the actual TCO signal is contaminated with an instantaneous noise n1 due to extraneous noise or with a relatively large driving noise n2 due to execution of the hand driving processing every second. This driving noise n2 occurs during the hand driving processing from the time when the control circuit 45 outputs the hand driving pulse to the stepping motors 41, 42 on the basis of the SEC signal output from the time counting circuit 50 and the stepping motors 41 and 42 rotate till the stepping motors 41 and 42 stop stably.

Furthermore, this driving noise n2 may contaminate during not only the low-level section (period) of the TCO signal, but also the high-level section (period) of the TCO signal. The driving noise n2 mixing during the low-level section varies in accordance with the power of the stepping motors 41, 42, the distance between the stepping motor 41, 42 and the antenna AN1, the electric field intensity of the standard radio wave, etc., and it is equal to about 80 ms at maximum, for example.

Therefore, in the second synchronous point detecting processing of this embodiment, the pulses such as the instantaneous noise n1, the hand driving pulse n2 and the original high-level pulse of the TCO signal are discriminated from one another on the basis of the pulse lengths thereof, so that the second synchronous point t0 is detected with excluding the effects of the noise n1, n2.

First, the processing operation when the driving noise n2 mixes during the low-level section of the TCO signal as shown in the second section SEG2 and the third section SEG3 of FIG. 4 will be described. In this case, the control circuit 45 measures the pulse width of the high-level pulse of the TCO signal, and identifies whether this pulse is the instantaneous noise n1, the driving noise n2 or the original TCO signal pulse. Specifically, the control circuit 45 sets an interrupt based on a rising input of the TCO signal to be kept under an interrupt standby state when pulse detection is started. When there is an interrupt based on the rising input, it is checked whether this high level pulse exceeds the pulse width (for example, 10 ms) of the instantaneous noise n1, thereby identifying the instantaneous noise n1.

Subsequently, when the high-level pulse does not exceed the pulse width of the instantaneous noise n1, the measurement of the time B (see (D) of FIG. 4) is started by the internal counter, and also the control circuit 45 sets an interrupt based on a falling input to be kept under an interrupt standby state. When there is an interrupt based on the falling input of the TCO signal under this state, the internal counter is stopped and the time B is measured. The pulse width of the high level pulse of the TCO signal is represented by the thus-measured time B. The start of the measurement of the time B is delayed from the rising input of the TCO signal by 10 ms. However, 10 ms is a negligible level and also the delay of 10 ms occurs at all times, and thus the time B may be added with the delay amount of 10 ms and the addition result may be handled as a pulse width.

When the pulse width of the TCO signal is measured by the time B, the control circuit 45 compares the value of the time B with a pulse width threshold (for example, 125 ms) as a first time width for discriminating between the maximum pulse width (for example, 80 ms) of the assumed driving noise n2 and the minimum high-level pulse width (for example, 200 ms of "0" signal) of the original TCO signal. When the value of the time B is equal to or less than the pulse width threshold, the pulse is identified as the driving noise n2. On the other hand, when the pulse is equal to or more than the pulse width threshold, the pulse is identified as the high-level pulse of the original TCO signal.

When the pulse is identified as the original high-level pulse of the TCO signal, the falling timing of the pulse is set as a candidate of the second synchronous point t0, and for example, the candidate of the second synchronous point t0 is likewise obtained at three times. When the intervals of these candidates are equal to substantially one second interval (for example, 1 second±50 ms), these candidates are determined as the second synchronous points t0.

Next, the processing operation when the driving noise n2 mixes during the high-level section of the TCO signal as shown in the first section SEG1 of FIG. 4 will be described. In the control circuit 45, the hand driving processing is executed on the basis of the input of the SEC signal, and thus the contamination timing of the driving noise can be predicted to some extent. Therefore, the control circuit 45 prohibits the interrupt based on the falling input of the TCO signal at least during the hand driving processing period so that the driving noise n2 mixing during the high level is neglected. In this embodiment, the pulse width of the SEC signal is substantially equal to the hand driving processing period, and thus the SEC signal prohibits the interrupt based on the falling input of the TCO signal during the high level period.

Furthermore, the driving noise n2 mixing during the high level period fits into the period H of the interrupt prohibition based on the SEC signal because the low level pulse width of the driving noise n2 is relatively small.

The interrupt prohibiting processing as described above is executed. Therefore, even when the falling of the TCO signal occurs during the period H of the interrupt prohibition under the state that the control circuit 45 waits for the interrupt based on the falling input of the TCO signal, the interrupt based on the falling input of the TCO signal does not occur if the TCO signal is high level when the time gets out of the period H of the interrupt prohibition. On the other hand, if the TCO signal is low level when the time gets out of the period H of the interrupt prohibition, the interrupt based on the falling input of the TCO signal occurs at this out-of-timing.

Through the interrupt prohibiting processing as described above, when the driving noise n2 mixes in the high-level section of the TCO signal as shown in the first section SEG1 of FIG. 4, this driving noise n2 does not affect the measurement of the time B, and the pulse width of the high-level pulse of the original TCO signal can be measured by the time B. The original high-level pulse of the TCO signal is identified on the basis of the measurement value of the time B, and the falling timing is obtained as a candidate of the second synchronous point t0.

Figure 5:
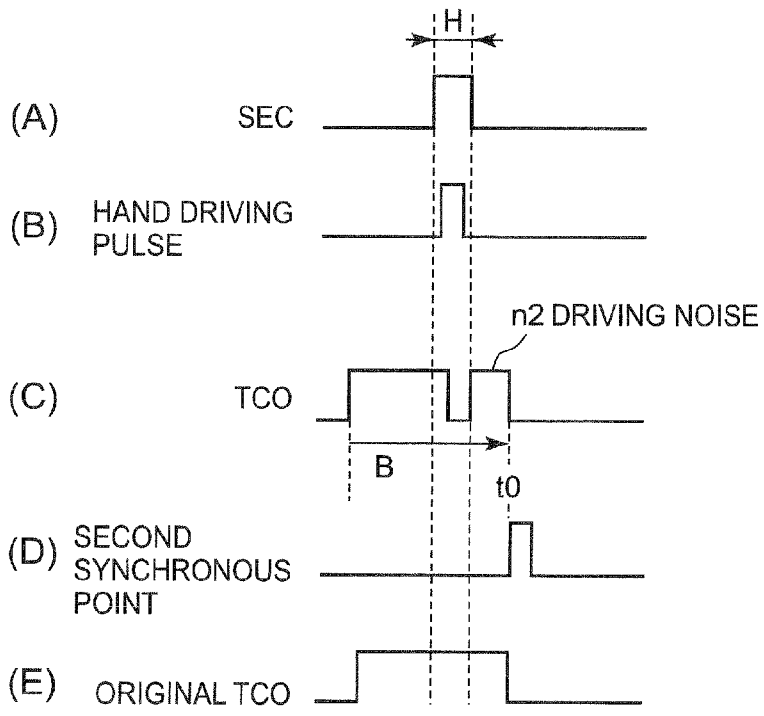
FIG. 5 is a time chart showing the processing content when a driving noise is mixed just before the second synchronous point.
Figure 6:
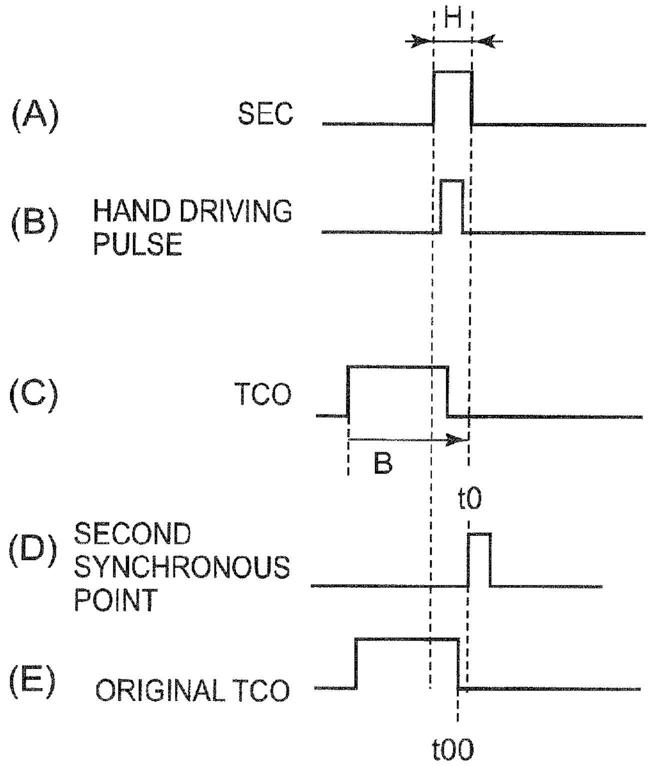
FIG. 6 is a time chart showing the processing content of the second synchronous point detecting processing when the driving noise is overlapped with the second synchronous point.

FIGS. 5 and 6 are time charts showing the processing content when the driving noise n2 mixes in the neighborhood of the second synchronous point in the second synchronous detecting processing In FIGS. 5 and 6, (A) represent an SEC signal, (B) represents a hand driving pulse, (C) represents a TCO signal, (D) represents a settled second synchronous point and (E) represents an ideal TCO signal.

The processing when the driving noise 2 mixes in the high-level section of the TCO signal described above likewise acts on a case where the driving noise n2 mixes just before the terminal of the high-level pulse of the TCO signal ((E) of FIG. 5). That is, after the interrupt based on the rising input of the TCO signal occurs and the measurement of the time B is started, the control circuit 45 is set to the standby state for the interrupt based on the falling input of the TOC signal. However, no interrupt occurs upon the falling of the driving noise n2 because of the interrupt prohibiting processing based on the SEC signal when the driving noise n2 mixes. Furthermore, when the time gets out of the period H of the interrupt prohibition, the TCO signal is high level, and thus no interrupt occurs at the timing at which the time gets out of the period H.

Accordingly, the measurement of the time B which is started due to the rising interrupt of the TCO signal is not affected by the falling of the driving noise n2, and it is continued until the interrupt based on the original falling input of the TCO signal occurs, and thus the measurement value of the time B exceeds the pulse width threshold (125 ms). Accordingly, this falling timing can be obtained as a candidate of the second synchronous point t0.

On the other hand, the period of the hand driving processing based on the SEC signal is overlapped with the original second synchronous point t00 as shown in FIG. 6, the following action is made. In this case, the waveform of the terminal of the original TCO signal collapses due to the driving noise and thus the falling edge thereof shifts ahead. However, the period H of the interrupt prohibition is set by the SEC signal, and thus the interrupt based on the falling input of the TCO signal occurs at the timing at which the time gets out of the prohibition period H. Accordingly, the measurement of the time B which is started by the interrupt based on the rising input of the TCO signal is continued until the time gets out of the interrupt prohibition period H. Accordingly, the measurement value of the time B exceeds the pulse width threshold (125 ms), and thus the original high-level pulse of the TCO signal is identified.

However, the occurrence timing of the interrupt is delayed by the interrupt prohibition, and thus the second synchronous point t0 detected by the control circuit 45 is slightly delayed from the original second synchronous point t00. However, the interrupt-prohibited period H of the hand driving processing is equal to several tens ms, and this is not so long, so that this second synchronous point t0 is a negligible-level value. The standard radio wave of Japan is equal to 200 ms even in the case of the minimum pulse, and thus the pulse width thereof is long. Therefore, the delay of the second synchronous point t0 can be regarded as a permissible error.

Figure 7:
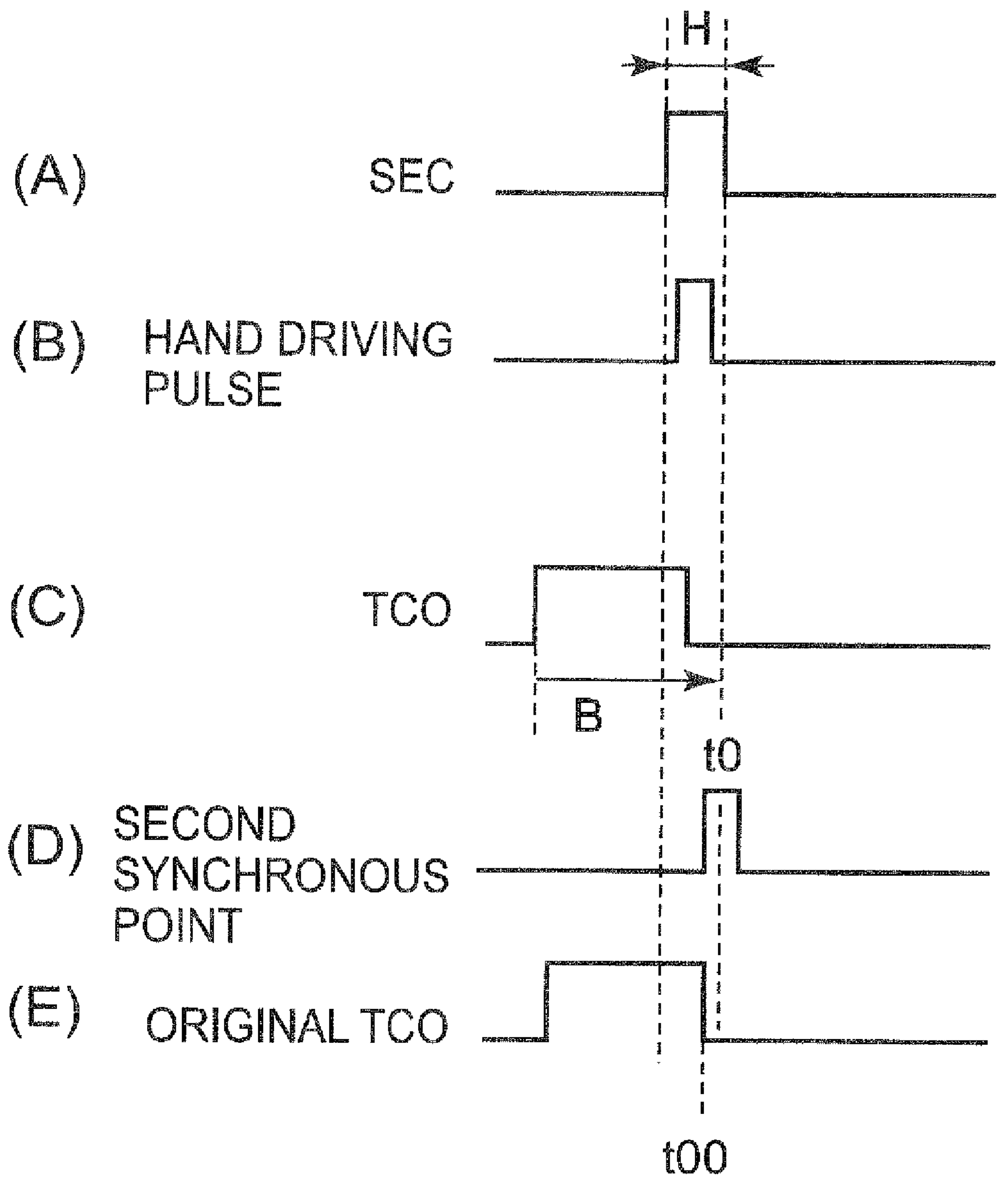
FIG. 7 is a time chart showing a modification of the processing content of the second synchronous point detecting processing when the driving noise is overlapped with the second synchronous point.

FIG. 7 is a time chart showing a modification of the processing content when the driving noise is overlapped with the second synchronous point in the second synchronous point detecting processing. In FIG. 7, (A) represents an SEC signal, (B) represents a hand driving pulse, (C) represents a TCO signal, (D) represents a settled second synchronous point and (E) represents an ideal TCO signal.

As shown in FIG. 7, when the interrupt based on the falling input of the TCO signal occurs at the timing at which the time gets out of the interrupt prohibition period H and thus the measurement value of the time E exceeds the pulse width threshold (125 ms), a time point t01 obtained by correcting the timing of this interrupt based on the falling input so that the timing concerned is former by a predetermined time may be applied as a candidate of the second synchronous point. With this construction, when the hand driving processing period is overlapped with the original second synchronous point t00, the error of the detected second synchronous point t01 can be reduced.

The method of detecting the second synchronous point containing the correction processing of FIG. 7 may be executed when an error occurs at a plurality of times in the reception processing of the standard radio wave or in the second synchronous point detecting processing of the step S1. Alternatively, the probability of such a situation that the hand driving processing period is overlapped with the original second synchronous point t0 is low, and thus when an error occurs at a plurality of times, the second synchronous point detecting processing may be executed again while the hand driving timing is shifted by 0.5 second or the like.

Next, the control procedure of the second synchronous point detecting processing will be described.

Figure 8:
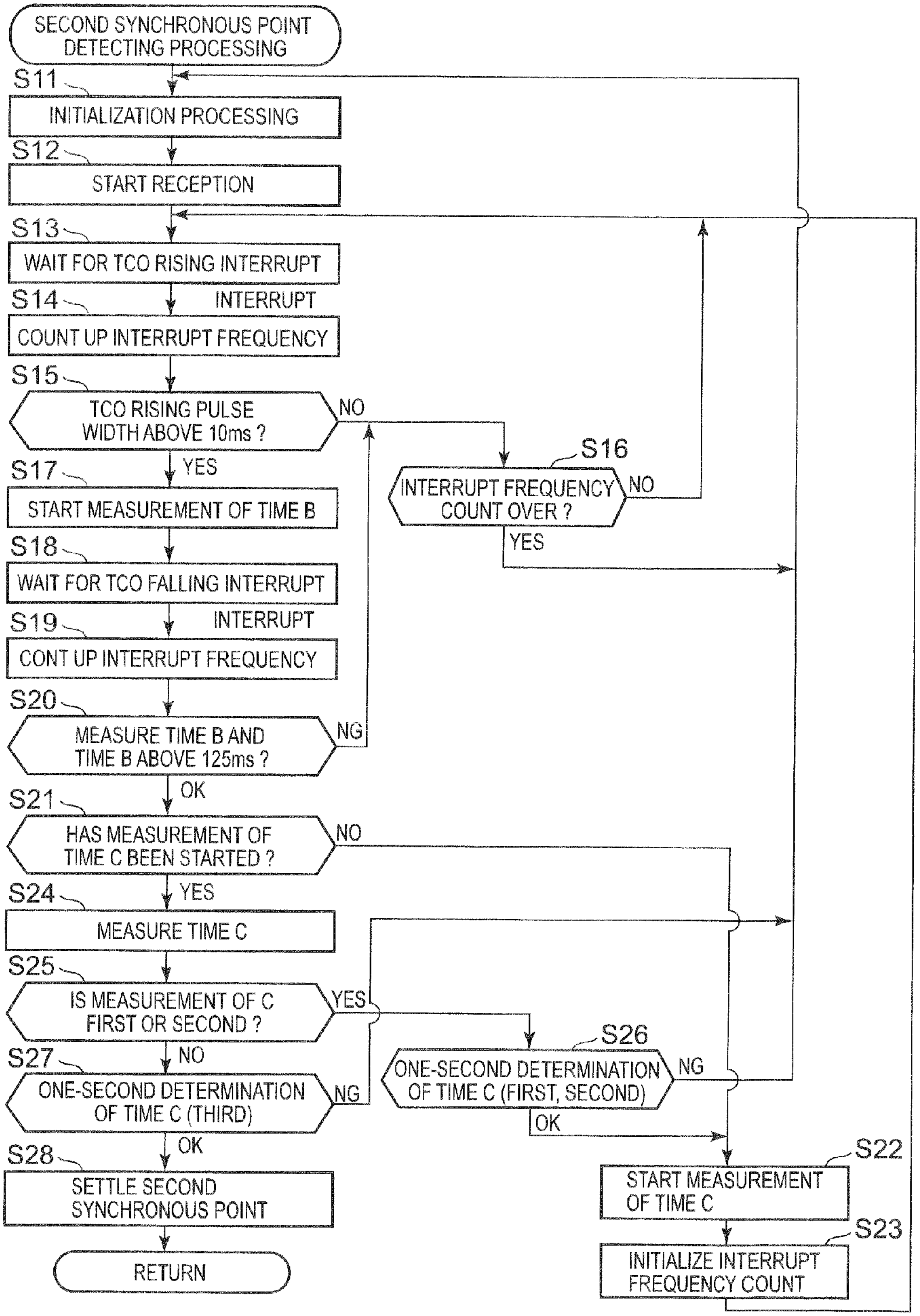
FIG. 8 is a flowchart showing the control processing of the second synchronous point detecting processing executed in step S1 of FIG. 3.

FIG. 8 is a flowchart of the second synchronous point detecting processing executed by the control circuit 45.

When the processing shifts to the second synchronous point detecting processing, the control circuit 45 first executes initialization processing (step), and then actuates the reception circuit 52 to start reception of a radio wave (step S12). Furthermore, the control circuit 45 is set to the standby state for the interrupt based on the rising input of the TCO signal (step S13: first interrupt controller, first timing detector). When there is a rising input of the TCO signal and thus interrupt occurs under this state, the processing shifts to the next step to count up the interrupt frequency (the number of times) (step S14). The count of this interrupt frequency is used to determine whether the number of noises is excessive or not.

Subsequently, the control circuit 45 starts the measurement of a time A and also monitors the TCO signal to determine whether the high-level pulse period is equal to or more than a noise threshold (10 ms) for identifying an instantaneous noise (step S15: noise judger). When the high-level pulse period is less than the noise threshold, it is determined that this rising interrupt is caused by an instantaneous noise. Therefore, the Processing shifts to "NO" side to temporarily determine whether the count value of the interrupt frequency reaches an excessively large value (count over) (step S16). When the count value does not reach the excessively large value, the processing returns to the step S13. On the other hand, when the count value reaches the excessively large value, it is determined that the noise is excessively large, and thus the processing is retried from the initial step S11 after a fixed period elapses, for example.

On the other hand, when the measurement value of the time A exceeds the noise threshold (10 ms) in the determination processing of the step S15, it is determined that the pulse is not an instantaneous pulse. Therefore, the measurement of the time B for measuring the pulse width is first started (step S17: time counter). Furthermore, the control circuit is set to the standby state for the interrupt based on the falling input of the TCO signal in order to detect the falling of the pulse (step S18: second interrupt controller, second timing detector). When there is a falling input of the TCO signal and thus an interrupt occurs, the interrupt frequency is first counted up (step S19), the time B for which the measurement is started in step S17 is checked, and it is judged whether the value of the time B exceeds a pulse width threshold (125 ms) for discriminating between the driving noise n2 and the minimum pulse of the TCO signal (step S20: comparator).

That is, in step S20, the pulse width of the high-level pulse of the TCO signal is measured, and it is judged whether this pulse is the driving noise n2 or the original pulse of the TCO signal.

As a result, when the value of the time B does not exceed the pulse width threshold (125 ms), it is determined that the pulse concerned is the driving noise n2, and thus the processing shifts to the step S16. On the other hand, when the value of the time E exceeds the pulse width threshold (125 ms), it is determined that the pulse concerned is the original pulse of the TCO signal and thus the present time point is a candidate of the second synchronous point t0. Therefore, the processing shifts to the next step S21.

The processing of the step S21 and subsequent steps is the processing of obtaining candidates of the second synchronous point three times and checking whether the candidates of the second synchronous point t0 are correct or not. That is, when the processing shifts to the step S21, it is first determined whether the measurement of a time C has been started or not (step S21). The processing of measuring the time C is for measuring the time between the respective candidates of the second synchronous point t0. When the candidate of the second synchronous point t0 is obtained once, the measurement of the time C has not yet been started; and thus the processing branches to "NO" side to start the measurement of the time C (step S22). Subsequently, the interrupt frequency cont is initialized (step S23), and then the processing returns to the step S13 again.

On the other hand, in the determination processing of step S21, when the present operation of obtaining the candidate of the second synchronous point t0 is the second or third operation, the measurement of the time C has been started, and thus the determination result of the step S21 shifts to "YES" side. First, the value of the time C is obtained (the time C is measured) (step 924: second synchronization time counter). When this measurement of the time C is the first or second operation (step 925), it is determined whether the time C corresponds to the normal interval (for example, 1 second±50 ms) of the second synchronous points (step S26: second synchronization determination unit). As a result, when the time C corresponds to the normal interval of the second synchronous points, it can be determined that there is no abnormality in the obtained candidates of the second synchronous points at present, and thus the processing shifts to step S22. On the other hand, when the time C does not correspond to the normal interval of the second synchronous points, it is determined that the second synchronous point is erroneously detected, and thus the processing returns to the step S11 to retry the processing from the begging.

Then, when a normal result is subsequent in the one-second determination of the step S26 and further the operation of obtaining the candidate of the second synchronous point t0 is the third operation, the processing shifts to "NO" side in the determination processing of the step S25. The third operation of the one-second determination is executed (step S27). When a normal result is obtained, the present time point (the occurrence timing of the falling interrupt of the step S18) is settled as the second synchronous point t0 (step S28). That is, for example, the internal counter (which may be software or hardware) of the control circuit 45 for counting one-second period is reset, and the start point of the counting period thereof is made coincident with the second synchronous point t0.

Figure 9:
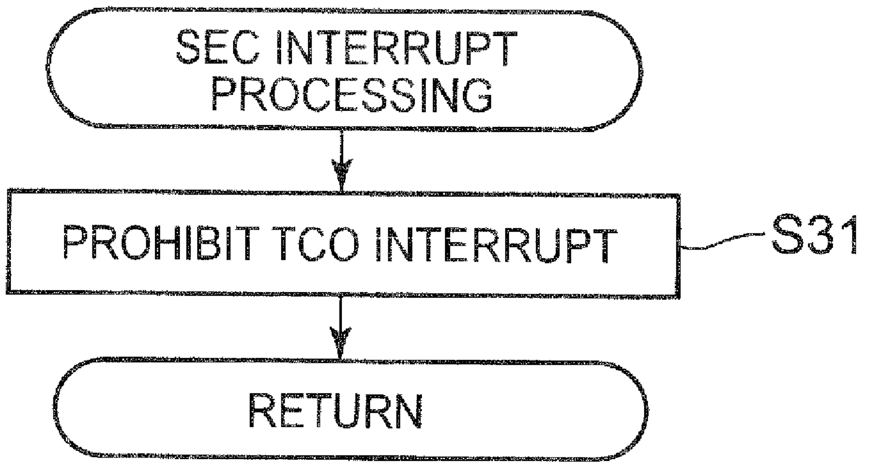
FIG. 9 is a flowchart showing SEC interrupt processing executed in response to input of the SEC signal.
Figure 10:
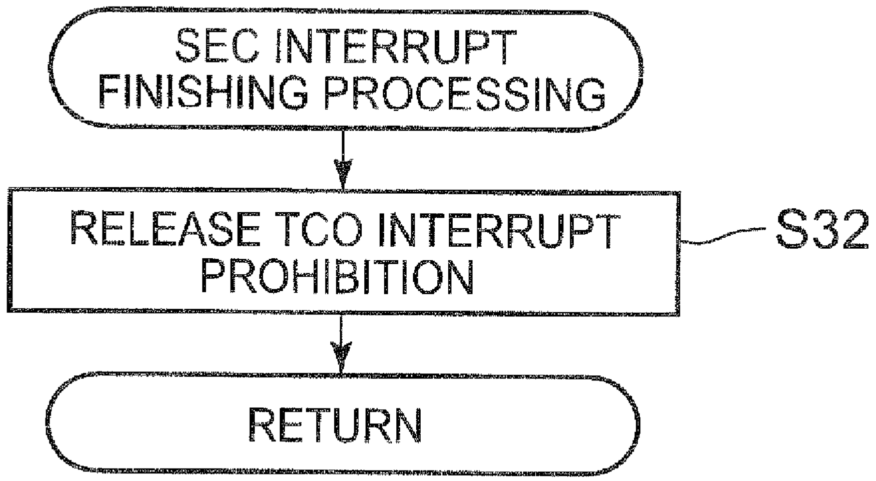
FIG. 10 is a flowchart showing SEC interrupt finishing processing executed when the SEC signal is finished.

FIGS. 9 and 10 are flowcharts showing SEC interrupt processing and SEC interrupt finishing processing executed on the basis of the input of the SEC signal during the second synchronous point detecting processing.

When the second synchronous point detecting processing described above is executed, the control circuit 45 prohibits at least occurrence of the interrupt based on the falling input of the TCO signal during the high-level period of the SEC signal as shown in FIGS. 9 and 10 (step S311: interrupt prohibition unit). Furthermore, the control circuit 45 releases this prohibition when the SEC signal is low level (step S32: interrupt prohibition unit). The control of this interrupt prohibition may be executed by software processing or hardware processing of the control circuit 45.

Through the interrupt prohibiting control described above, even when the driving noise n2 mixes into the high level section of the TCO signal, the second synchronous point t0 can be detected with discriminating between the pulse of the TCO signal and the driving noise n2 as shown in the first section SEG1 of FIG. 4 and FIGS. 5 and 6.

[Minute Synchronous Point Detecting Processing]

Next, the minute synchronous point detecting processing executed in step S2 of the reception processing (FIG. 3) will he described.

Figure 11:
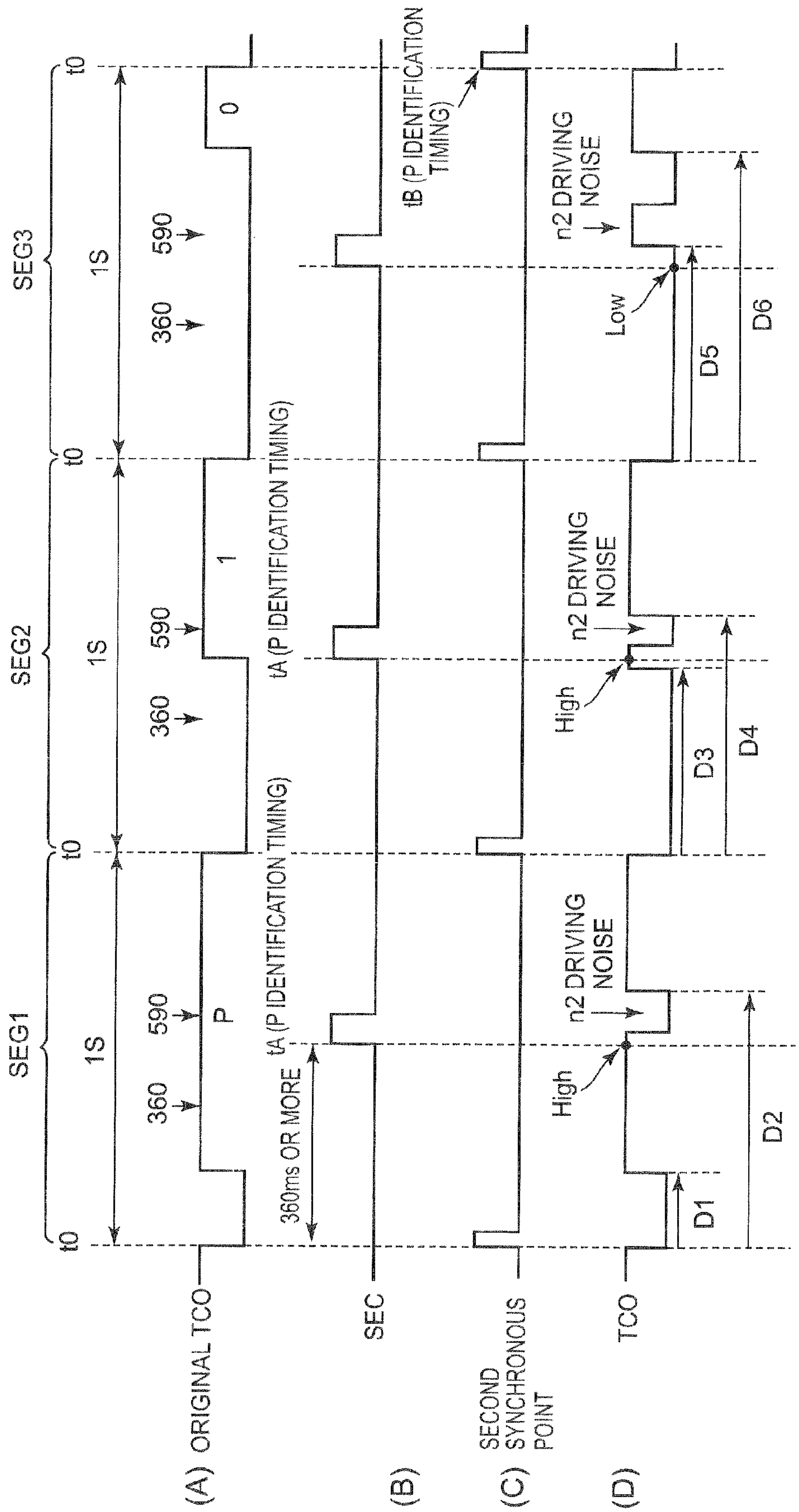
FIG. 11 is a time chart showing an identifying method of a P signal when the SEC signal is located after a second synchronous point by 360 ms or more in a minute synchronous point detecting processing, wherein (A) represents an original TCO signal, (B) represents an SEC signal, (C) represents a second synchronous point and (D) represents a TCO signal.
Figure 12:
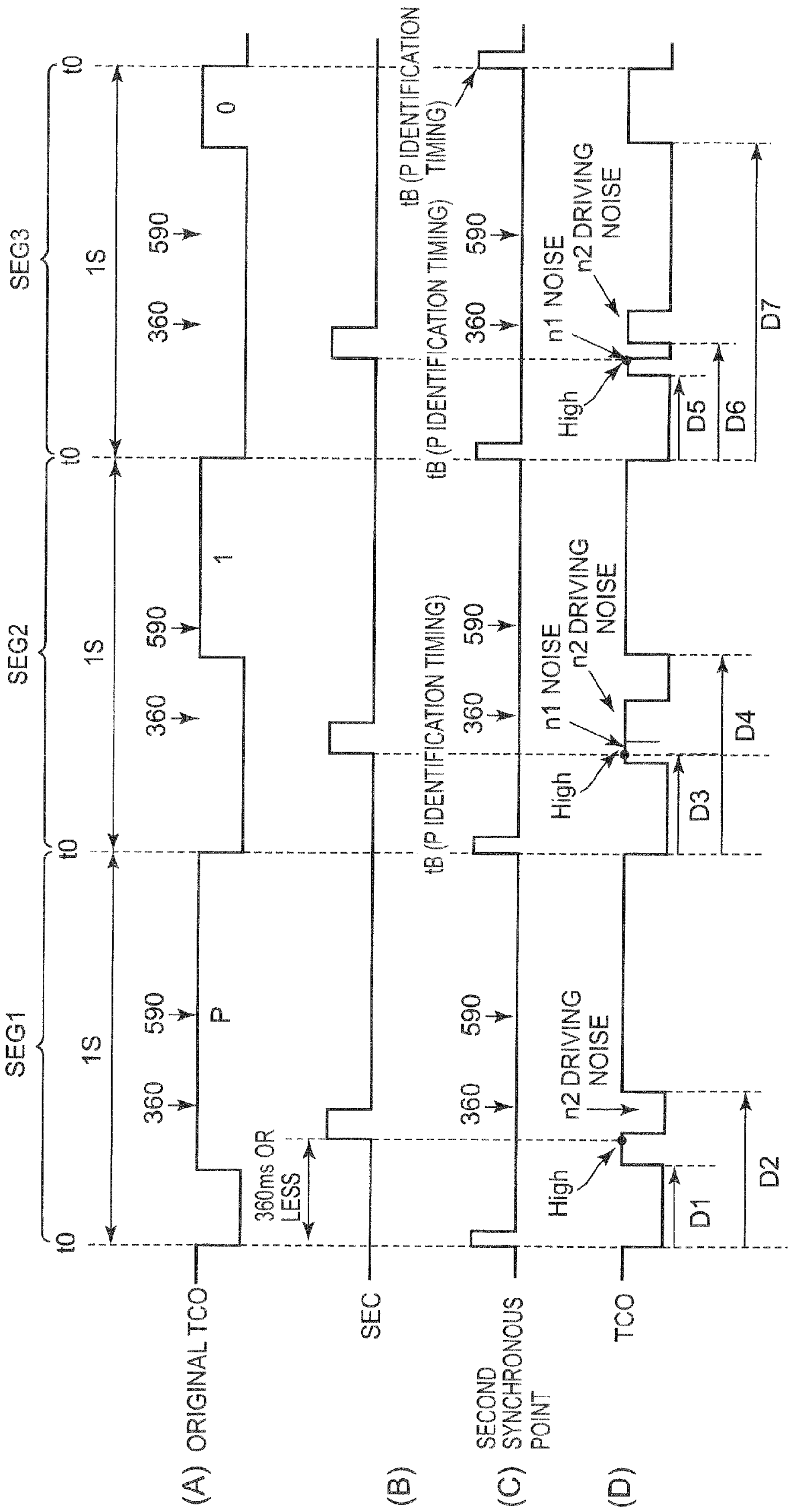
FIG. 12 is a time chart showing the identifying method of the P signal when an SEC signal is located before a time point of 360 ms past a second synchronous point in the minute synchronous point detecting processing, wherein (A) represents an original TCO signal, (B) represents an SEC signal, (C) represents a second synchronous point, and (D) represents a TCO signal.

FIGS. 11 and 12 are time charts showing the method of identifying the P signal in the minute synchronous point detecting processing. FIG. 11 shows a case where the SEC signal is located after the time point of 360 ms past the second synchronous point t0, and FIG. 12 shows a case where the SEC signal is located before the time point of 360 ms past the second synchronous point t0.

The minute synchronous point detecting processing is executed by detecting the P signal in the time code signal at a plurality of times. As shown in FIGS. 11 and 12, the detection of the P signal is executed by measuring the times D1, D2, D3, . . . from the second synchronous point till the rising time point of the TCO signal and using the measurement values of the times D1, D2, D3, . . . .

In the case of an ideal TCO signal having no noise, the measured times D1, D2, D3, . . . are in the range of "200 ms±an error" for P signal, "500 ms±an error" for 1 signal and "800 ms±an error" for 0 signal. In the case of the ideal TCO signal, in order to discriminate these signals from one another, a P signal identification value (for example, 360 ms) and a 0 signal identification value (for example, 590 ms) are used. Specifically, when the measured time D1, D2, D3, is shorter than the P signal identification value, the signal is identified as the P signal, when the measured time D1, D2, D3, . . . is in the range from the P signal identification value to the 0 signal identification value, the signal is identified as the 1 signal, and when the measured time D1, D2, D3, . . . is longer than the 0 signal identification value, the signal is identified as the 0 signal.

Here, the P signal identification value is not limited to the above value, and it may be set to a value between the time value of the P signal (200 ms) and the time value of the 1 signal (500 ms) in consideration of the permissible error. Furthermore, the 0 signal identification value is not limited to the above value, and it may be set to a value between the time value of the 1 signal (500 ms) and the time value of the 0 signal (800 ms) in consideration of the permissible error.

In this embodiment, the hand driving processing is also executed during the minute synchronous point detecting processing, and thus the driving noise 2*n* may mix into the TCO signal. Therefore, in the minute synchronous point detecting processing of this embodiment, the determination condition of the P signal is changed in accordance with the start timing of the hand driving processing period (for example, the input timing of the SEC signal) for which the driving noise n2 occurs, and the level of the TCO signal at this timing. Through the control of changing the determination condition, even when the driving noise n2 mixes into the TCO signal, the minute synchronous point is detected with excluding the effect of the hand driving noise n2 at maximum level. The details thereof will be described below.

The determination condition of the P signal is determined as anyone of three kinds of determination conditions in accordance with whether the timing of the SEC signal serving as a trigger of the hand driving processing exceeds a predetermined timing threshold (for example, 360 ms) or not in time when the second synchronous point t0 is set as a starting point and whether the TCO signal is high level or not at the input timing of the SEC signal.

Here, the timing threshold (360 ms) is a timing threshold with which the P signal and the 1 signal having a pulse width nearest to the P signal can be discriminated from each other, and the timing threshold is set to an intermediate value (360 ms) between the rising timing of the original P signal (200 ms) and the rising timing of the 1 signal (500 ms). In this embodiment, this value is set to the same value as the P signal identification value described above. In consideration of the permissible error of 100 ms, the value of 300 ms to 400 ms can be set as the timing threshold. Furthermore, the timing threshold and the P signal identification value may be set to different values.

As shown in the first section SEG1 and the second section SEG2 of FIG. 11, the method of identifying the P signal when the SEC signal is later than the timing threshold (360 ms) and the TCO signal is high level at the input timing of the SEC signal is as follows. That is, the times D1, D3, D5, . . . from the second synchronous point t0 as a starting point till the rising of the TCO signal are first successively measured. When the rising is detected in the TCO signal at a plurality of times, the times D2, D4, D6, . . . are successively measured from the second synchronous point t0 with respect to each of a plurality of detections of the rising. When the measurement times D1 and D3 settled at the input timing tA of the SEC signal are shorter than the P signal identification value as the first pulse width threshold (excluding non-settled measured time), the signal is identified as the P signal. In the other cases, it is identified as a signal other than the P signal.

For example, in the first section SEG1 of FIG. 11, the time D1 has been settled as the measured time until the rising of the TCO signal at the input timing tA of the SEC signal. This time D1 is shorter than the P signal identification value (360 ms). Accordingly, the TCO signal is identified as the P signal.

Furthermore, in the second section SEG2 of FIG. 11, the time D3 has been settled as the measured time until the rising of the TCO signal at the input timing tA of the SEC signal. This time D3 is longer than the P signal identification value (360 ms). Accordingly, the TCO signal is identified as a signal other than the P signal.

As shown in the third section SEG3 of FIG. 11, the method of determining the P signal when the TCO signal is low level at the input timing of the SEC signal is as follows. In this case, the method is not restricted by the timing of the SEC signal. In this case, times D5, D6, . . . are likewise successively measured until the rising of the TCO signal with the second synchronous point t0 set as a starting point. The next second synchronous point, t0 is set as an identification timing tB, and the signal is identified as the P signal when the finally settled measured time D6 at the identification timing tB is shorter than the P signal identification value and also identified as a signal other than the P signal in the other cases.

In the third section SEG3 of FIG. 11, the measured time D6 measured finally at the identification timing tB is longer than the P signal identification value (360 ms), and thus it is identified as a signal other than the P signal.

As shown in FIG. 12, the method of determining the P signal when the input timing of the SEC signal is earlier than the timing threshold (360 ms) and also the TCO signal at the input timing of the SEC signal is high level is as follows. That is, first, the times D1, D3, D5, . . . are successively measured until the rising of the TCO signal with the second synchronous point to set as a starting point. When the rising of the TCO signal is detected at a plurality of times, the times D2, D4, D6, D7, . . . are successively measured from the second synchronous point t0 with respect to each rising of the TCO signal. The next second synchronous point t0 is set as the identification timing tB, and the signal is identified as the P signal when the measured times D2, D4, D7 settled finally at the identification timing tB are shorter than the 0 signal identification value (590 ms) as the second pulse width threshold which is greatly different from the pulse width of the P signal and also identified as a signal other than the P signal in the other cases.

For example, in the first section SEG1 of FIG. 12, the SEC signal is earlier than the timing threshold (360 ms) and the TCO signal at the input timing of the SEC signal is high level. Therefore, the next second synchronous point t0 is set as the identification timing tB of the P signal. At this identification timing tB, the time which has been finally settled among the measured times until the rising of the TCO is the time D2. This time D2 is shorter than the 0 signal identification value (590 ms), and thus the TCO signal is identified as the P signal.

In the second section SEG2 of FIG. 12, the SEC signal is earlier than the timing threshold (360 ms) and the TCO signal at the input timing of the SEC signal is high level. Therefore, the next second synchronous point t0 is set as the identification timing tB of the P signal. At this time, at the identification timing tB, the time which has been finally settled among the measured times until the rising of the TCO signal is the time D4. This time D4 is shorter than the 0 signal identification value (590 ms), and thus the TCO signal is identified as the P signal.

Actually, this TCO signal of the second section SEG2 is not "P signal", but "1 signal" In, this example, a large noise n1 mixes just before the driving noise n2, and thus the TCO signal at the input timing of the SEC signal is high level, so that erroneous detection occurs. When there is not the noise n1, the identification of the P signal is based on the comparison between the time D4 and the P signal identification value (360 ms), and thus it is identified that the signal is not "P signal". The erroneous identification as described above occurs only when the TCO signal is "1 signal" and also the SEC signal is earlier than the timing threshold (360 ms) and further the noise n1 mixes just before the driving noise n2. The occurrence probability of the erroneous detection described above is very low, and when such erroneous detection occurs, the processing is finished as an error in the subsequent processing. Therefore, it is not really a problem.

In the third section SEG2 of FIG. 12, the SEC signal is earlier than the timing threshold (360 ms) and the TCO signal at the input timing of the SEC signal is high level. Therefore, the next second synchronous point t0 is set as the identification timing tB of the P signal. At the identification timing tB, the time which has been finally settled among the measured times until the rising of the TCO signal is the time D7. This time D7 is longer than the 0 signal identification value (590 ms), and thus it is determined that the TCO signal is not "P signal". As described above, when the TCO signal is "0 signal", it is not erroneously detected as the P signal even when the noise n1 mixes just before the driving noise n2.

Next, the control procedure of the minute synchronous point detecting processing will be described.

Figure 13:
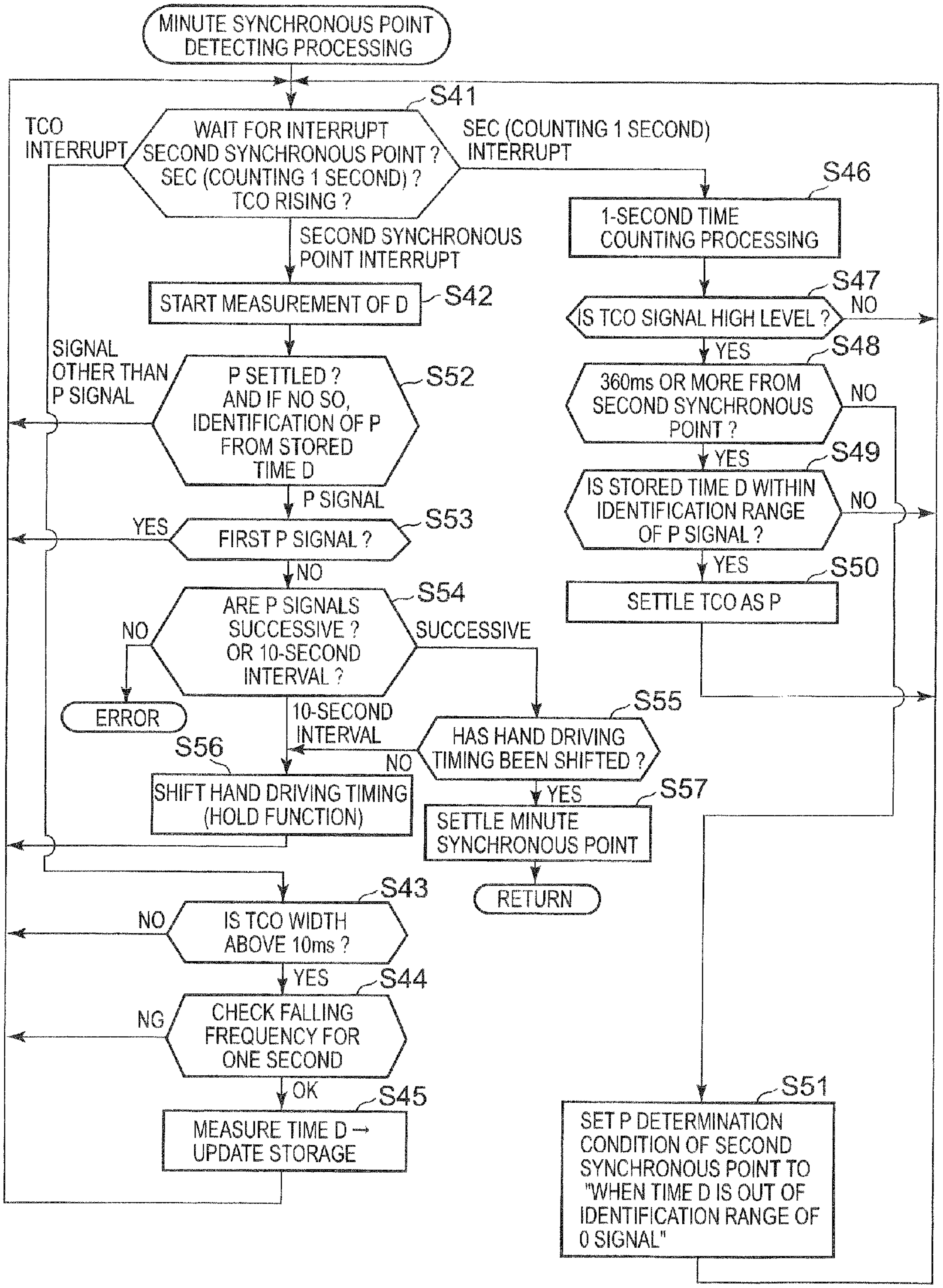
FIG. 13 is a flowchart showing the control procedure of the minute synchronous point detecting processing executed in step S2 of FIG. 3.
Figure 14A:
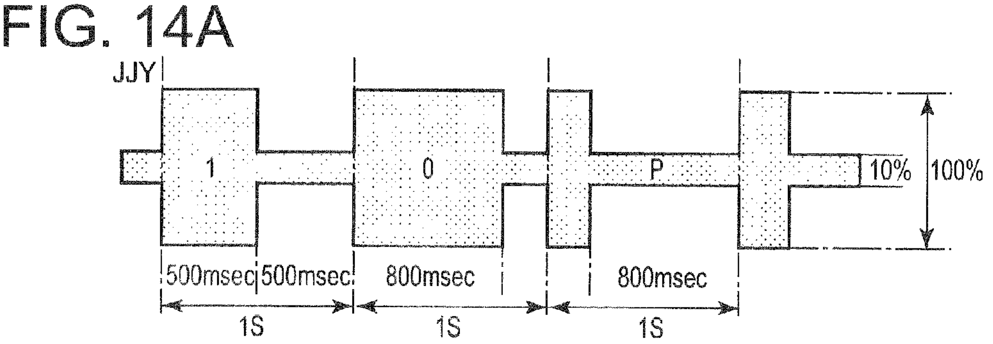
FIGS. 14A to 14E are diagrams showing the pulse waveforms of world standard electronic waves to which the second synchronous point detecting processing of this embodiment is applicable.
Figure 14B:
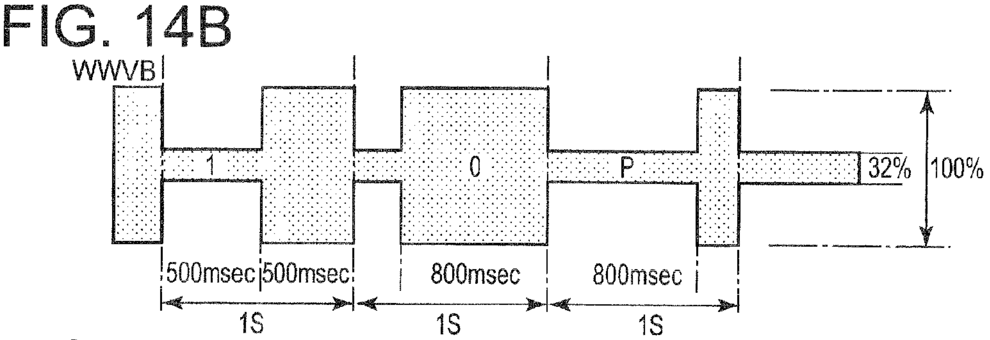
Figure 14C:
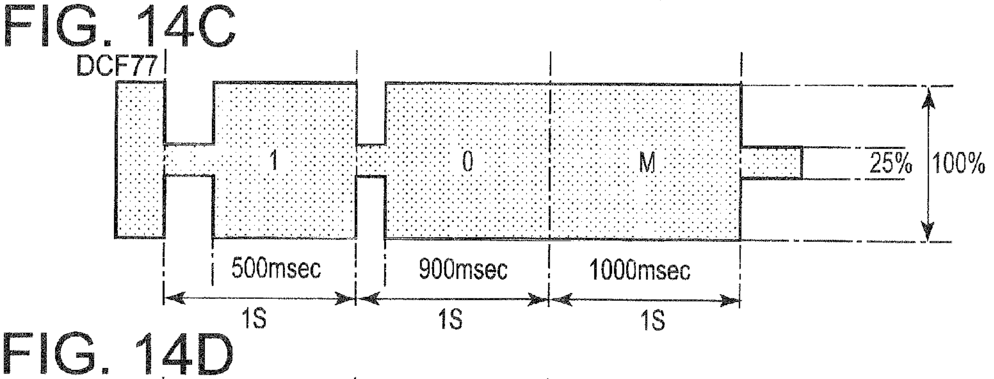
Figure 14D:
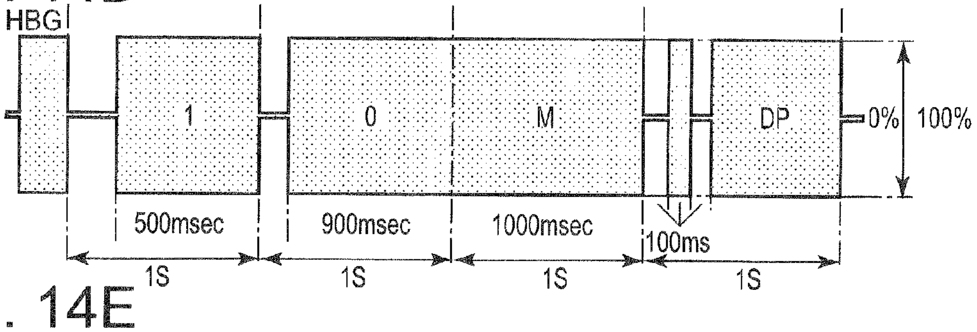
Figure 14E:
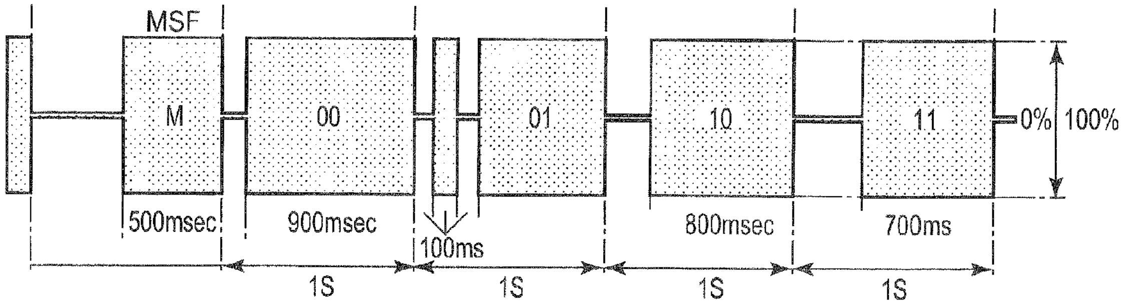

FIG. 13 is a flowchart showing the minute synchronous point detecting processing executed by the control circuit 45.

When the processing shifts to the minute synchronous point detecting processing, the control circuit 45 first shifts to the interrupt standby state until there occurs an interrupt such as an internal interrupt to count the second synchronous point to by internal counting, an interrupt based on the SEC signal and an interrupt based on rising input of the TCO signal (step S41).

As a result, when the internal interrupt of the second synchronous point occurs, the control circuit 45 first starts the measurement of the time D (step S42), and the processing of the control circuit 45 shifts to the next step S52. The description of the processing from the step S52 will be made later, and thereafter the processing returns to the step S41 again.

When the interrupt based on the rising input of the TCO signal occurs under the interrupt standby state of the step S41, the processing shifts to step S43 to first monitor the TCO signal and judge whether the high-level pulse period is equal to or more than a noise threshold (10 ms) for identifying an instantaneous noise (step S43). As a result, when the high-level pulse period is not less than the noise threshold, a falling frequency per one second is checked to determine superfluity of noise (step S44). When it is not superfluity of noise, the time D for which the measurement is started in step S42 is checked, and the measured time D at this time point is stored (step S45: pulse width counter). When the previous measured time D has been already stored, it is updated by the value of the measured time D which is newly obtained at this time point. Through the processing of the step S45, the times D1, D2, . . . from the second synchronous point t0 until the rising of the TCO signal shown in FIGS. 11 and 12 are successively obtained and stored.

When an instantaneous noise is identified in step S43, when superfluity of noise is determined in step S44, or when the measurement of the time D is performed in step S45, the processing returns to the step S41 again and set to the interrupt standby state.

On the other hand, when the input interrupt of the SEC signal occurs under the interrupt standby state of the step S41, the processing first shifts to step S46 to execute the 1-second time counting processing (step S46) which is irrelevant to the minute synchronous point detection. Subsequently, it is judged whether the TCO signal is high level or not at this time point (step S47). When the TCO signal is high level, it is judged whether this time point exceeds the time point of the timing threshold (360 ms) with the second synchronous point set as a starting point (step S48).

As a result, when it is judged in step S47 that the TCO signal is low level, the processing directly returns to the step S41 to perform the normal P signal determination.

On the other hand, when it is judged in step S47 that the TCO signal is high level and also it is judged in step S48 that this time point exceeds the time point of the timing threshold (360 ms), the processing shifts to step S49 to determine whether the measurement value of the presently stored time D is within the range of the P signal identification value (within 360 ms) (step S49: first pulse identifier). When the measurement value concerned is within the range concerned, the TCO signal is settled as the P signal (step S50). Thereafter, the processing returns to the step S41.

On the other hand, when it is judged in step S47 that the TCO signal is high level and also it is judged in step S48 that this time point is before the time point of the timing threshold (360 ms), the processing shifts to step S51 to change the determination condition of the P signal to a condition "P signal when the measured time D is shorter than the 0 signal identification value" (step S51), and then the processing returns to step S41.

Thereafter, when the time reaches the next second synchronous point and the internal interrupt of the second synchronous point occurs, the measurement of the new time ID is started (step S42: pulse width counter), and then it is checked whether the TCO signal in this section is settled as the P signal in step S50. When the TCO signal is not settled, the processing of identifying "P signal" or not is executed on the basis of the measurement value of the time D stored at the present time (step S52: second pulse identifier). Here, with respect to the determination condition of the P signal, when the determination condition is changed during the time period from the previous internal interrupt of the second synchronous point till the present interrupt in step S51, the identification as to "P signal" or not is made on the basis of a changed determination condition "P signal when the finally settled measured time D is shorter than the 0 signal identification value (590 ms)". When the determination condition of the step S51 is not changed, the identification as to "P signal" or not is made on the basis of a normal determination condition "P signal when the settled measured time D is shorter than the P signal identification value (360 ms)".

As a result, when "P signal" is not identified, the processing returns to the step S41 again.

On the other hand, when "P signal" is identified in step S52, it is judged whether the signal is the first P signal or not (step S53). When the signal is not the first P signal, it is judged whether two P signals are successive or the time interval between the previous P signal and the present P signal is equal to 10 seconds (step S54). As a result, it is judged that neither the two P signals are successive nor the time interval is equal to 10 seconds, it may be determined that the detection is erroneous, and thus the processing is finished as an error. On the other hand, when the time interval of 10 seconds is judged, the hand driving timing is shifted from the second synchronous point to the time point of about 800 ms (step S56), and then the processing returns to step S41. Here, the shift of the hand driving timing is to shift the driving noise n2 to a position at which no erroneous pulse identification occurs. The shift of the hand driving timing is instantaneously executed only once in one reception processing operation, and thus it does not make the user feel uncomfortable.

On the other hand, it is judged in step S54 that the two P signals are successive, it is checked whether the hand driving timing has been shifted or not (step S55). When the hand driving timing has not yet been shifted, the hand driving timing is shifted (step S56: hand driving timing changing unit), and then the processing returns to the step S41. When the hand driving timing has been already shifted, it is determined that the two successive P signals have been detected under the state that erroneous detection occurs very hardly because the hand driving timing is shifted, and thus the timing at the start edge of the second P signal is settled as a minute synchronous point (step S57) When the minute synchronous point is settled, the minute synchronous point detecting processing is finished, and the processing shifts to the next step of the reception processing (FIG. 3).

When the processing shifts to the step S3 of the reception processing, the hand driving timing is properly shifted, and thus it is possible to obtain each code of the frame of the time code by the normal identification method of the TCO signal.

As described above, according to the analog type electronic timepiece 1 of this embodiment, the second synchronous point t0 of the TCO signal is detected while identifying the driving noise n2, and thus it is possible to accurately obtain the second synchronous point t0 with excluding the effect of the driving noise n2.

Furthermore, the time width of the pulse appearing in the TCO signal is measured by the detection of the rising and falling of the TCO signal, and this measurement value is compared with the pulse width threshold (125 ms) set between the driving noise n2 and the minimum pulse of the TCO signal to perform the pulse identification. Therefore, the driving noise n2 and the original pulse of the TCO signal can be accurately discriminated from each other.

Furthermore, in the second synchronous point detecting processing, the rising and falling of the TCO signal are detected by using the interrupt function of the control circuit 45, and thus the pulse width of the TCO signal can be accurately measured with a small processing load.

Still furthermore, when the rising of the TCO signal is detected, counting of a slight time is directly executed to check "instantaneous noise" or not. Therefore, in the detecting processing of the second synchronous point, the effect of the slight noise can be surely excluded.

Furthermore, when the pulse of the TOC signal is identified to obtain a candidate of the second synchronous point, the time C till a candidate of the next synchronous point is obtained is measured, and it is determined whether the time C is equal to the 1-second interval within the permissible error, thereby settling the second synchronous point t0. Therefore, the second synchronous point can be more surely detected.

Furthermore, occurrence of the interrupt based on the falling input of the TCO signal is prohibited during the hand driving processing period (the high level period of the SEC signal in this embodiment). Therefore, even in a situation that the driving noise n2 mixes during the high-level section of the TCO signal, the effect thereof can be excluded and the accurate second synchronous point t0 can be detected.

Furthermore, according to the analog type electronic timepiece 1 of this embodiment, in the minute synchronous point detecting processing, the identification of the P signal is performed under a different condition, for example, by shifting the identification timing of the P signal or by changing the threshold for identifying the P signal in accordance with the timing of the hand driving processing. Therefore, the P signal can be accurately identified by using the different determination condition which is suitable for the relationship between the TCO signal and the occurrence timing of the driving noise.

Still furthermore, in the minute synchronous point detecting processing, the identification of the P signal is performed under a different condition in accordance with the level of the TCO signal at the input timing of the SEC signal. Therefore, a case where the driving noise mixes during the high-level section of the TCO signal is judged, and the P signal can be accurately identified by using the determination condition suitable for this case.

Specifically, the input timing of the SEC signal is later than the timing threshold (360 ms) and also the TCO signal at this timing is high level, the identification of the P signal is executed at the rising timing (the measurement value of the time D) of the TCO signal which has been detected until the above input timing. In the other cases, the identification of the P signal is executed at the rising timing (the measurement value of the time D) of the TCO signal which has been detected until the timing of the next second synchronous point. Therefore, a case where the occurrence timing of the driving noise may overlap the high-level pulse of the TCO signal and a case where the occurrence timing concerned never overlaps the high-level pulse of the TCO signal can be discriminated from each other, so that the P signal can be accurately identified under the determination condition suitable for each case.

Furthermore, the timing threshold (360 ms) which contributes to the decision of the determination condition the P signal is set between the rising timing of the P signal and the rising timing of the 1 signal whose pulse width is nearest to the P signal. Therefore, it is judged whether the driving noise n2 occurs before or after the above timing, so that the timing threshold can contribute to the accurate identification of the P signal.

More specifically, when the input timing of the SEC signal is later than the timing threshold (360 ms) and also the TCO signal at this timing is high level, the identification of the P signal is executed by using the P signal identification value at the input timing of the SEC signal. Furthermore, when the input timing of the SEC signal is earlier than the timing threshold (360 ms or more) and also the TCO signal at this timing is equal to high-level, the identification of the P signal is executed by using the 0 signal identification value at the timing of the next synchronous point. In the other cases, the identification of the P signal is executed by using the P signal identification value at the timing of the next second synchronous. Therefore, effect of the driving noise n2 can be properly excluded and the accurate identification of the P signal can be performed.

Furthermore, in the minute synchronous point detecting processing of this embodiment, when the P signal is detected, the hand driving timing is shifted to a timing at which the identification of the P signal is hardly affected by the driving noise, and then P signals are successively detected again. A minute synchronous point is determined on the basis of the sequential detection of P signals, and thus the minute synchronous point can be more accurately detected.

Accordingly, according to the analog type electronic timepiece 1 of this embodiment, there can be obtained an effect that accurate time information can be obtained by receiving a standard radio wave with neither stopping the second-by-second hand driving of the second hand 2 nor frequently generating irregular motion of the second hand 2 which makes a user uncomfortable.

The present invention is not limited to the above embodiment, and various modifications may be made. For example, in the second synchronous point detecting processing, the value of the pulse width threshold (125 ms) for comparing the driving noise n2 and the minimum pulse of the TCO signal may be stored in a rewritable non-volatile memory such as EEPROM or the like. In this case, the maximum width of the driving noise n2 is measured every electronic timepiece type before factory shipment or under development, and the timing threshold proper to each electronic timepiece type is determined and written into EEPROM. With this construction, the control circuit 45 and the control program in ROM 46 can be made common, and they can be applied to a plurality of types of electronic timepieces which are different in motor type or packaging construction so that the optimum second synchronous point detecting processing is executed.

Furthermore, when the electric field intensity of the standard radio wave is very low and an error frequently occurs in the reception processing, the hand driving of the second hand 2 may be stopped, only the hand driving of the hour hand 4 and the minute hand 3 may be executed and the reception processing may be likewise executed. In this case, the driving noise n2 vanishes or decreases through the processing, and thus the reception processing can be normally finished.

Still furthermore, the above embodiment adopts the construction of outputting the active-low TCO signal which is set to low level by the reception circuit 52 when the amplitude level of the radio wave signal is large and also set to high level by the reception circuit 52 when the amplitude level is small. However, the present invention may be likewise applied to the opposite construction that an active-high TCO signal is outputted. In this case, the rising detection is replaced by the falling detection, and the falling detection is replaced by the rising detection, whereby the same action can be performed.

Still furthermore, the above embodiment is applied to the standard radio wave of Japan, however, the present invention is likewise applicable to standard radio waves of different formats of all the countries of the world.

FIG. 14A to 14E shows pulse waveforms of standard radio waves of the world to which the second synchronous point detecting processing of this embodiment is applicable. With respect to the standard radio waves of the respective countries which comprise pulse signals shown in FIG. 14A to 14E, the second synchronous point can be detected by discriminating between the driving noise and the pulse of the TCO signal of each standard radio wave when the pulse width of the driving noise is not larger than the minimum p of each standard radio wave. Furthermore, the P signal and the M signal can be accurately identified by changing the condition of the pulse determination of the TCO signal in accordance with the occurrence timing of the driving noise or the level of the TCO signal.

The detailed portions of the above embodiment may be properly changed without departing from the subject matter of the present invention. For example, in order to detect the rising and falling of the TCO signal, a method of sampling the TCO signal at a predetermined period and binarizing the sampled TCO signal may be used in place of use of the interrupt function. Furthermore, the period H of the interrupt prohibition in the second synchronous point detecting processing may be set to a slightly longer period when the high-level period of the SEC signal is shorter or the like.

What is claimed is:

1. An analog type electronic timepiece comprising:

a plurality of hands for displaying a time;

a driving unit for electrically driving the hands;

a receiver for receiving and demodulating a radio wave containing a time code signal;

a controller that inputs the time code signal from the receiver and has an interrupt function caused by a rising input of the time code signal and an interrupt function caused by a falling input of the time code signal;

a first timing detector for detecting a rising timing of the time code signal;

a second timing detector for detecting a falling timing of the time code signal after detection of the first timing detector;

a comparator for comparing a time width from a detection timing of the first timing detector until a detection timing of the second timing detector with a predetermined first time width;

a second synchronization determination unit for setting the detection timing of the second timing detector as a candidate of a second synchronous point when it is determined by the comparator that the time width exceeds the predetermined first time width, and determining the second synchronous point of the time code signal based on the candidate; and an interrupt prohibition unit for prohibiting an interrupt caused by the falling input of the time code signal during a hand driving processing period of the driving unit;

wherein the first timing detector is configured to detect the rising timing of the time code signal through the interrupt function caused by the rising input of the controller; and wherein the second timing detector is configured to detect the falling timing of the time code signal through the interrupt function caused by the falling input of the controller.

2. The analog type electronic timepiece according to claim 1, wherein the predetermined first time width is set to a value that is longer than a time width of driving noise and shorter than a minimum time width of a rising pulse contained in an ideal time code signal having no noise.

3. The analog type electronic timepiece according to claim 1, further comprising a noise judger for judging whether or not a rising pulse of the time code signal is caused by an instantaneous noise, wherein the second timing detector detects the falling timing of the time code signal, provided that the first timing detector detects the rising timing of the time code signal and then the noise judger judges that the rising pulse is not caused by the instantaneous noise.

4. The analog type electronic timepiece according to claim 1, further comprising:

a second synchronization time counter for counting a time width from a timing of the candidate of the second synchronous point until a timing of another candidate of the second synchronous point obtained next; and a second synchronization judging unit for judging whether or not the candidate of the second synchronous point is true based on a count value of the second synchronization time counter;

wherein the second synchronization determination unit determines as the second synchronous point of the time code signal the candidate that is judged as being true by the second synchronization judging unit.

5. The analog type electronic timepiece according to claim 1, further comprising:

a minute synchronization determination unit for identifying a position pulse signal which is contained in the time code signal and represents a frame position of the time code signal, thereby determining a minute synchronous point;

a pulse width counter for measuring a time from the second synchronous point until a latest rising timing of the time code signal;

a first pulse identifier for identifying the position pulse signal based on a measurement value of the pulse width counter which is obtained until a hand driving processing timing, provided that the hand driving processing timing is later than a predetermined timing threshold and that the time code signal is high level at the hand driving processing timing; and a second pulse identifier for identifying the position pulse signal based on a measurement value of the pulse width counter which is obtained until a next second synchronous point, provided that the hand driving processing timing is earlier than the predetermined timing threshold or that the time code signal is low level at a starting point of the hand driving processing timing;

wherein the minute synchronization determination unit determines the minute synchronous point based on the position pulse signals identified by the first pulse identifier and the second pulse identifier.

6. The analog type electronic timepiece according to claim 5, wherein the predetermined timing threshold is set to a timing between a rising timing of the position pulse signal with the second synchronous point set as a starting point and an earliest timing of rising timings of all data pulse signals representing a data value with each second synchronous point set as a starting point in an ideal time code signal having no noise.

7. The analog type electronic timepiece according to claim 5, wherein the first pulse identifier identifies the position pulse signal by using a first pulse width threshold capable of discriminating between a pulse width of the position pulse signal and a pulse width of a data pulse signal representing a data value provided that a measurement value of the pulse width counter which has been obtained until the hand driving processing timing is smaller than the first pulse width threshold; and wherein the second pulse identifier (i) identifies the position pulse signal provided that the time code signal is low level at a starting point of the hand driving processing timing and that a measurement value of the pulse width counter which has been obtained until the second synchronous point is smaller than the first pulse width threshold, and (ii) identifies the position pulse signal by using a second pulse width threshold capable of discriminating between a zero-th data signal which is not near to the position pulse signal in pulse width and a first data signal which is near to the position pulse signal in pulse width, provided that the time code signal is high level at a starting point of the hand driving processing timing and that the measurement value of the pulse width counter at the second synchronous point is smaller than the second pulse width threshold.

8. The analog type electronic timepiece according to claim 5, wherein the minute synchronization determination unit includes a hand driving timing changing unit for shifting the hand driving processing timing to a timing at which identification of the other position pulse signals is substantially not affected after identification of one of the position pulse signals, wherein after the hand driving processing period is shifted to a subsequent side, identification of the other position pulse signal is executed to determine the minute synchronous point.

9. An analog type electronic timepiece comprising:

a plurality of hands for displaying a time;

a driving unit for electrically driving the hands;

a receiver for receiving and demodulating a radio wave containing a time code signal;

a controller that inputs the demodulated time code signal and has an interrupt function caused by a rising input of the demodulated time code signal and an interrupt function caused by a falling input of the demodulated time code signal;

a first interrupt controller for enabling the interrupt function of the rising input of the controller when a processing shifts to pulse detecting processing of the time code signal;

a first timing detector for detecting a rising timing of the time code signal by the interrupt function of the rising input;

a noise judger for judging whether or not a rising pulse of the time code signal detected by the first timing detector is caused by an instantaneous noise based on a width of the rising pulse;

a second interrupt controller for enabling the interrupt function of the falling input of the controller provided that the first timing detector detects the rising timing and then the noise judger judges that the rising pulse is not caused by the instantaneous noise;

a time counter for starting a time count of a rising pulse width of the time code signal provided that the first timing detector detects the rising timing and then the noise judger judges that the rising pulse is not caused by the instantaneous noise;

a second timing detector for detecting a falling timing of the time code signal by the interrupt function of the falling input;

a comparator for judging whether a count value of the time counter exceeds a predetermined first time width when the second timing detector detects the falling timing;

a second synchronization time counter for setting a detected timing of the second timing detector as a candidate of a second synchronous point of the time code signal when the comparator judges that the count value exceeds the predetermined first time width, and starting to count a time from a timing of the candidate of the second synchronous point until a timing of another candidate of the second synchronous point obtained next;

a second synchronization judging unit for judging whether or not the candidate of the second synchronous point is true based on a count value of the second synchronization time counter;

a second synchronization determination unit for determining as the second synchronous point of the time code signal the candidate which is judged as being true by the second synchronization judging unit; and an interrupt prohibition unit for prohibiting an interrupt caused by the falling input of the time code signal during a hand driving processing period of the driving unit;

wherein the predetermined first time width compared by the comparator is set to a value that is longer than a time width of a driving noise mixed in the time code signal by action of the driving unit and shorter than a minimum time width of a rising pulse contained in an ideal time code signal having no noise.

10. An analog type electronic timepiece comprising:

a plurality of hands for displaying a time;

a driving unit for electrically driving the hands;

a receiver for receiving and demodulating a radio wave containing a time code signal;

a controller that inputs the time code signal from the receiver and has an interrupt function caused by a falling input of the time code signal and an interrupt function caused by a rising input of the time code signal;

a first timing detector for detecting a falling timing of the time code signal;

a second timing detector for detecting a rising timing of the time code signal after detection of the first timing detector;

a comparator for comparing a time width from a detection timing of the first timing detector until a detection timing of the second timing detector with a predetermined first time width;

a second synchronization determination unit for setting the detection timing of the second timing detector as a candidate of a second synchronous point when it is determined by the comparator that the time width exceeds the predetermined first time width, and determining the second synchronous point of the time code signal based on the candidate; and an interrupt prohibition unit for prohibiting an interrupt caused by the rising input of the time code signal during a hand driving processing period of the driving unit;

wherein the first timing detector is configured to detect the falling timing of the time code signal through the interrupt function caused by the falling input of the controller; and wherein the second timing detector is configured to detect the rising timing of the time code signal through the interrupt function caused by the rising input of the controller.

11. The analog type electronic timepiece according to claim 10, wherein the predetermined first time width is set to a value that is longer than a time width of driving noise and shorter than a minimum time width of a falling pulse contained in an ideal time code signal having no noise.

12. The analog type electronic timepiece according to claim 10, further comprising a noise judger for judging whether or not a falling pulse of the time code signal is caused by an instantaneous noise, wherein the second timing detector detects the rising timing of the time code signal, provided that the first timing detector detects the falling timing of the time code signal and then the noise judger judges that the falling pulse is not caused by the instantaneous noise.

13. The analog type electronic timepiece according to claim 10, further comprising:

a second synchronization time counter for counting a time width from a timing of the candidate of the second synchronous point until a timing of another candidate of the second synchronous point obtained next; and a second synchronization judging unit for judging whether or not the candidate of the second synchronous point is true based on a count value of the second synchronization time counter;

wherein the second synchronization determination unit determines as the second synchronous point of the time code signal the candidate that is judged as being true by the second synchronization judging unit.

14. The analog type electronic timepiece according to claim 10, further comprising:

a minute synchronization determination unit for identifying a position pulse signal which is contained in the time code signal and represents a frame position of the time code signal, thereby determining a minute synchronous point;

a pulse width counter for measuring a time from the second synchronous point until a latest falling timing of the time code signal;

a first pulse identifier for identifying the position pulse signal based on a measurement value of the pulse width counter which is obtained until a hand driving processing timing, provided that the hand driving processing timing is later than a predetermined timing threshold and that the time code signal is low level at the hand driving processing timing; and a second pulse identifier for identifying the position pulse signal based on a measurement value of the pulse width counter which is obtained until a next second synchronous point, provided that the hand driving processing timing is earlier than the predetermined timing threshold or that the time code signal is high level at a starting point of the hand driving processing timing;

wherein the minute synchronization determination unit determines the minute synchronous point based on the position pulse signals identified by the first pulse identifier and the second pulse identifier.

15. The analog type electronic timepiece according to claim 14, wherein the predetermined timing threshold is set to a timing between a falling timing of the position pulse signal with the second synchronous point set as a starting point and an earliest timing of falling timings of all data pulse signals representing a data value with each second synchronous point set as a starting point in an ideal time code signal having no noise.

16. The analog type electronic timepiece according to claim 14, wherein the first pulse identifier identifies the position pulse signal by using a first pulse width threshold capable of discriminating between a pulse width of the position pulse signal and a pulse width of a data pulse signal representing a data value provided that a measurement value of the pulse width counter which has been obtained until the hand driving processing timing is smaller than the first pulse width threshold; and wherein the second pulse identifier (i) identifies the position pulse signal provided that the time code signal is high level at a starting point of the hand driving processing timing and that a measurement value of the pulse width counter which has been obtained until the second synchronous point is smaller than the first pulse width threshold, and (ii) identifies the position pulse signal by using a second pulse width threshold capable of discriminating between a zero-th data signal which is not near to the position pulse signal in pulse width and a first data signal which is near to the position pulse signal in pulse width, provided that the time code signal is low level at a starting point of the hand driving processing timing and that the measurement value of the pulse width counter at the second synchronous point is smaller than the second pulse width threshold.

17. An analog type electronic timepiece comprising:

a plurality of hands for displaying a time;

a driving unit for electrically driving the hands;

a receiver for receiving and demodulating a radio wave containing a time code signal;

a controller that inputs the demodulated time code signal and has an interrupt function caused by a falling input of the demodulated time code signal and an interrupt function caused by a rising input of the demodulated time code signal;

a first interrupt controller for enabling the interrupt function of the falling input of the controller when a processing shifts to pulse detecting processing of the time code signal;

a first timing detector for detecting a falling timing of the time code signal by the interrupt function of the falling input;

a noise judger for judging whether or not a falling pulse of the time code signal detected by the first timing detector is caused by an instantaneous noise based on a width of the falling pulse;

a second interrupt controller for enabling the interrupt function of the rising input of the controller provided that the first timing detector detects the falling timing and then the noise judger judges that the falling pulse is not caused by the instantaneous noise;

a time counter for starting a time count of a falling pulse width of the time code signal provided that the first timing detector detects the falling timing and then the noise judger judges that the falling pulse is not caused by the instantaneous noise;

a second timing detector for detecting a rising timing of the time code signal by the interrupt function of the rising input;

a comparator for judging whether a count value of the time counter exceeds a predetermined first time width when the second timing detector detects the rising timing;

a second synchronization time counter for setting a detected timing of the second timing detector as a candidate of a second synchronous point of the time code signal when the comparator judges that the count value exceeds the predetermined first time width, and starting to count a time from a timing of the candidate of the second synchronous point until a timing of another candidate of the second synchronous point obtained next;

a second synchronization judging unit for judging whether or not the candidate of the second synchronous point is true based on a count value of the second synchronization time counter;

a second synchronization determination unit for determining as the second synchronous point of the time code signal the candidate which is judged as being true by the second synchronization judging unit; and an interrupt prohibition unit for prohibiting an interrupt caused by the rising input of the time code signal during a hand driving processing period of the driving unit;

wherein the predetermined first time width compared by the comparator is set to a value that is longer than a time width of a driving noise mixed in the time code signal by action of the driving unit and shorter than a minimum time width of a falling pulse contained in an ideal time code signal having no noise.

* * * * *